Feb. 17, 1959 C. R. LINSLEY ET AL 2,874,019

GRAPH PLOTTER

Filed Sept. 16, 1954 8 Sheets-Sheet 1

INVENTORS
CLARENCE R. LINSLEY
DAVID L. PICKENS

BY

Theodore H. Lassagne

ATTORNEY

Feb. 17, 1959 C. R. LINSLEY ET AL 2,874,019

GRAPH PLOTTER

Filed Sept. 16, 1954 8 Sheets-Sheet 2

INVENTORS
CLARENCE R. LINSLEY
DAVID L. PICKENS
BY
Theodore H. Lassagne
ATTORNEY

Feb. 17, 1959

C. R. LINSLEY ET AL

GRAPH PLOTTER 2,874,019

Filed Sept. 16, 1954

8 Sheets-Sheet 3

INVENTORS
CLARENCE R. LINSLEY
DAVID L. PICKENS

BY

Theodore H. Lassagne

ATTORNEY

Feb. 17, 1959 C. R. LINSLEY ET AL 2,874,019

GRAPH PLOTTER

Filed Sept. 16, 1951 8 Sheets-Sheet 4

INVENTORS
CLARENCE R. LINSLEY
DAVID L. PICKENS
BY
Theodore H. Lassagne
ATTORNEY

INVENTORS
CLARENCE R. LINSLEY
DAVID L. PICKENS
BY Theodore H. Lassagne
ATTORNEY

Feb. 17, 1959 C. R. LINSLEY ET AL 2,874,019

GRAPH PLOTTER

Filed Sept. 16, 1954 8 Sheets-Sheet 6

INVENTORS
CLARENCE R. LINSLEY
DAVID L. PICKENS

BY Theodore H. Lassagne
ATTORNEY

INVENTORS
CLARENCE R. LINSLEY
DAVID L. PICKENS
BY
Theodore H. Lassagne
ATTORNEY

INVENTORS
CLARENCE R. LINSLEY
DAVID L. PICKENS
BY
Theodore H. Lassagne
ATTORNEY

United States Patent Office 2,874,019

Patented Feb. 17, 1959

2,874,019

GRAPH PLOTTER

Clarence R. Linsley, La Crescenta, and David L. Pickens, Burbank, Calif., assignors to Librascope, Incorporated, Glendale, Calif., a corporation of California Application September 16, 1954, Serial No. 456,479

32 Claims. (Cl. 346—29)

This invention relates to recording apparatus and more particularly to apparatus for plotting a graph or other record of the relationship between a pair of quantities.

In the past few years, the field of electronic computers has made vast strides towards providing reliable equipment capable of performing a wide variety of functions. For example, computers have been built to solve in a minimum amount of time purely mathematical problems which have been solved by skilled mathematicians only after great time or effort or which have never been solved at all. Computers have also been built for use as business machines to automatically handle the various types of problems which occur daily in a busy office. And computers have been built to control the functions of production, such as the shape of pieces being cut by a milling machine.

The various computers which have been built are in general of two types. One type of computer has been classified as "digital." In digital computers, numerical information is obtained by the use of a plurality of signals, each of which represents a different digit in a multi-digital number. Each signal may have a high amplitude to represent a value such as "1" for a digit in the multi-digital number or may have a low amplitude to represent a value of "0" for the multi-digital number. In analogue computers, a number—even a multi-digital number—is represented by the amplitude of only one signal.

Although vast strides have been made in the development of electronic computers, the progress has not been matched in the development of accessory equipment for use with the computers. The progress has not been matched in spite of the considerable time and effort which has been devoted to the development and perfection of accessory items. Such accessory items include input mechanisms for feeding information into the computer for subsequent use by the computer and output mechanisms for providing a record of information derived by the computer as a result of its computations. Such output apparatus includes graph plotters for recording the relationship between a pair of quantities being derived by the computer.

The graph plotters now in use have in general not been entirely satisfactory for several reasons. The graph plotters have not been able to respond sufficiently rapidly to the information being derived by the computer as a result of its calculations. This is especially unfortunate since speed of computation is one of the great advantages being claimed for electronic computers. The graph plotters now in use are also not fully satisfactory since they are not sufficiently accurate and reliable. This is especially unfortunate when the graph plotters are used with digital computers since digital computers obtain solutions of problems with a high order of accuracy. The graph plotters now in use are somewhat complex and expensive. In spite of their high cost, the graph plotters now in use are in general not easily converted to uses at different times as accessory items to both digital and analogue computers.

This invention provides a graph plotter which overcomes the above disadvantages. The graph plotter is able to plot the relationship between pairs of analogue quantities as well as pairs of digital quantities. Components are also included for plotting isolated values as well as continuous curves. The graph plotter is able to provide such versatility and at the same time is able to provide a fast and accurate record whether the computer with which it is associated is analogue or digital.

The graph plotter includes a chart disposed in substantially a cylindrical segment. A support member such as a rack is positioned along substantially the axis of the cylindrical segment and a stylus is slidably and pivotably supported on the member. Means are included to slide the stylus along the support member through a distance dependent upon the value of a first quantity. Means are also included to pivot the stylus on the support member through an angle dependent upon the value of a second quantity.

The means used for sliding the stylus along the support member offer certain advantages. Such means include a driving shaft rotatable through an angle dependent upon the value of the first quantity. The means also include a pair of arms pivotable relative to each other and to the support member and rotatable by the driving shaft. A differential formed by a sun gear and a pair of planet gears is also included for coupling the arms to each other. By hingedly disposing the arms relative to each other and by using a differential to take up any lost motion resulting from the variable angular positioning of the arms, the sliding motion transmitted to the stylus is related only to the rotative movement of the driving shaft. This causes the stylus to have a linear displacement at any position along the support member and even at the two extremes of the support member in direct proportion to changes in the value of the first quantity.

Apparatus is also included for insuring an even and regulated flow of fluid to the stylus. The apparatus includes a housing for holding the fluid, a valve and a diaphragm atmospherically operative to open the valve when the supply of fluid in the housing falls below a minimum value. When the valve opens, fluid flows into the housing and closes the valve after the supply of fluid in the housing has reached a safe value. In this way, an adequate supply of fluid is always made available to the stylus to provide a permanent record on the chart.

An object of this invention is to provide a record such as a graphical plot of the relationship between a pair of quantities.

Another object is to dispose a chart in a cylindrical segment and to provide a record of a first quantity in an axial direction along the chart and to provide a record of a second quantity in an an arcuate direction along the chart.

A further object is to provide a graphical record of the relationship between a pair of analogue quantities or between a pair of quantities at isolated positions on the chart.

Still another object is to provide an accurate, reliable and speedy record of the relationship between a pair of quantities and to provide inexpensive apparatus for effectuating such advantageous results.

A still further object is to provide a uniform and regulated flow of fluid to the chart at all positions to be recorded on the chart.

Another object is to insure a linear displacement of a stylus in an axial direction in direct proportion to the value of a quantity being recorded and even at the extreme axial positions on the chart.

Other objects and advantages will be apparent from a detailed description of the invention and from the appended drawings and claims.

Figure 4:
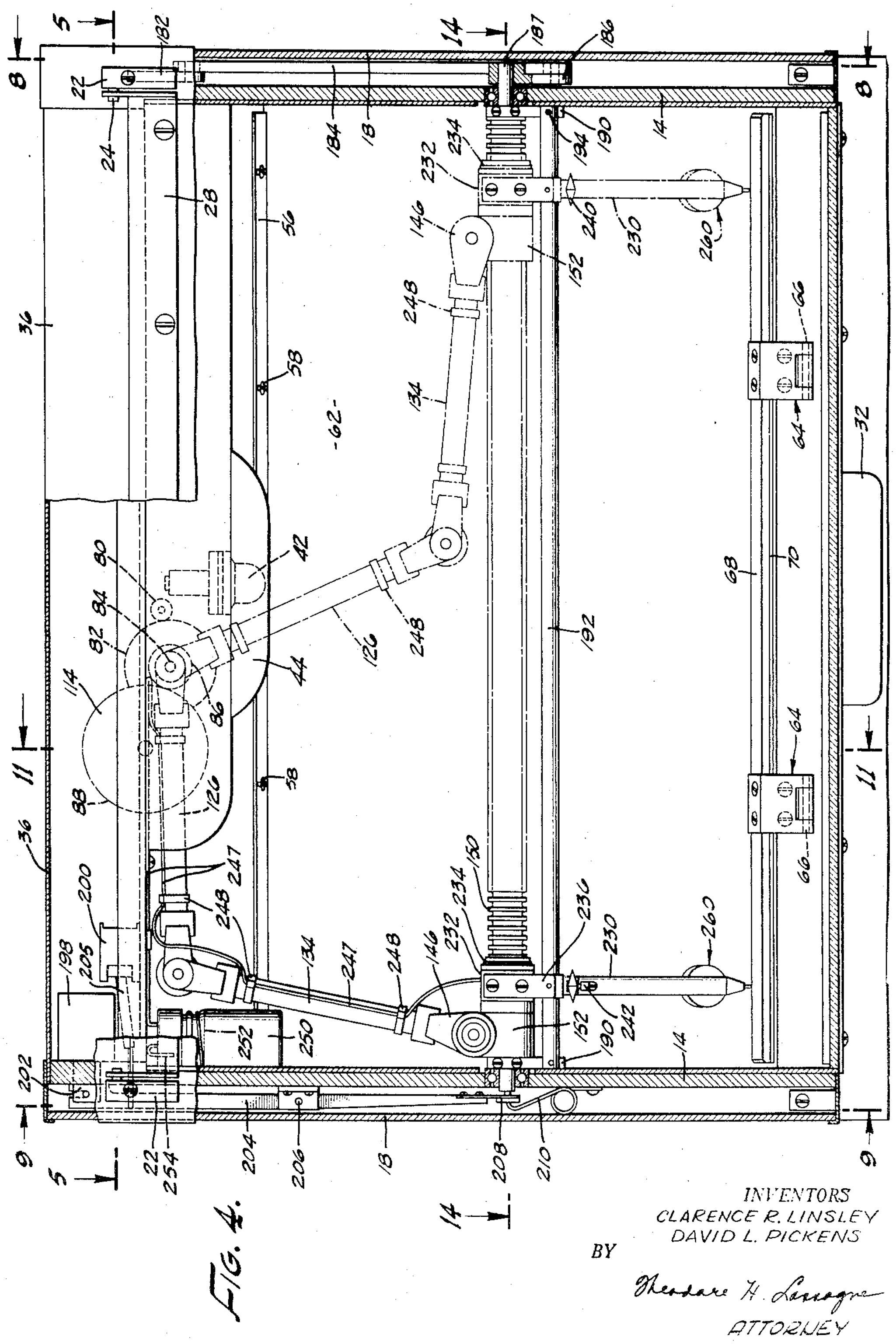
Figure 4 is an enlarged sectional view substantially on the line 4—4 of Figure 1, certain features including a stylus being shown in solid lines in an initial positioning and in broken lines in a subsequent positioning.
Figures 5, 6, 7:
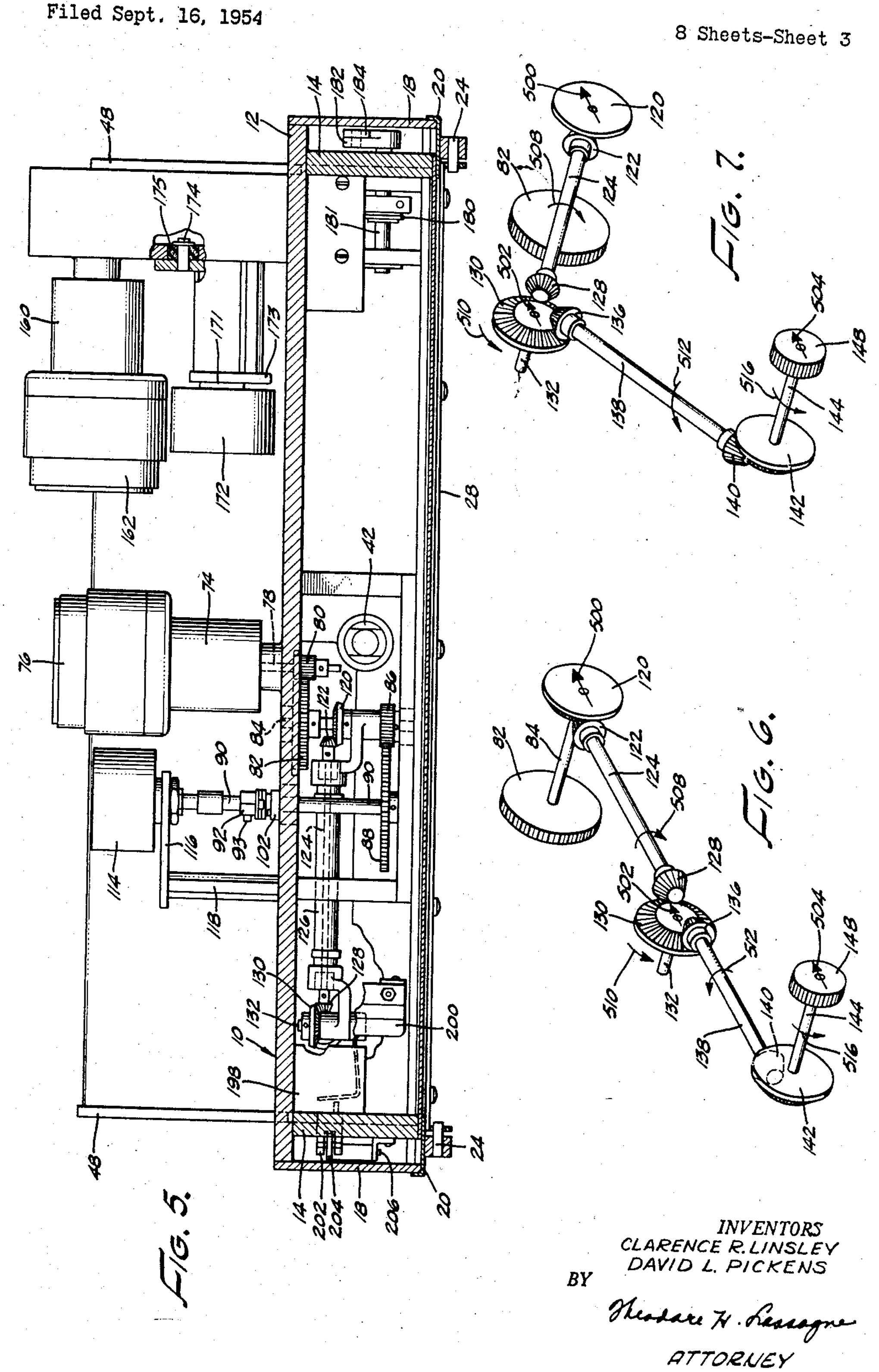
Figure 5 is an enlarged sectional view substantially on line 5—5 of Figure 4 and illustrates in further detail certain features shown in Figure 4.
Figure 6 is an enlarged perspective view of certain components shown in Figures 4 and 5 and somewhat schematically illustrates the operation of these components in one positioning of the components.
Figure 7 is an enlarged perspective view of the components shown in Figure 6 and further illustrates the operation of these components in a different positioning of the components.
Figures 8, 9:
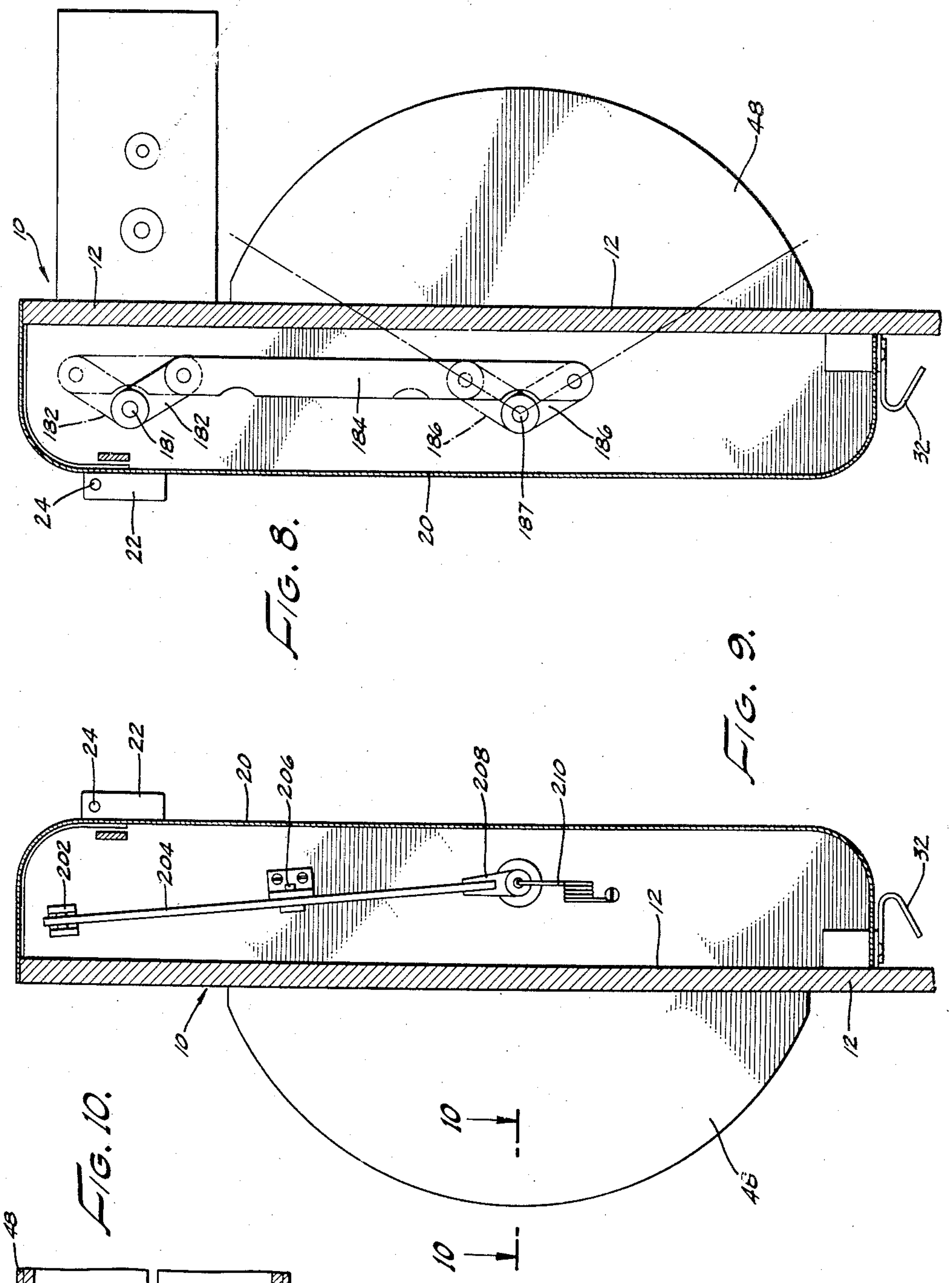
Figure 10:
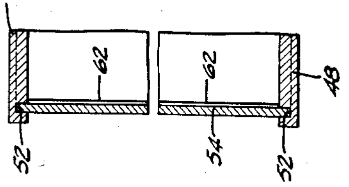
Figures 11, 12, 13:
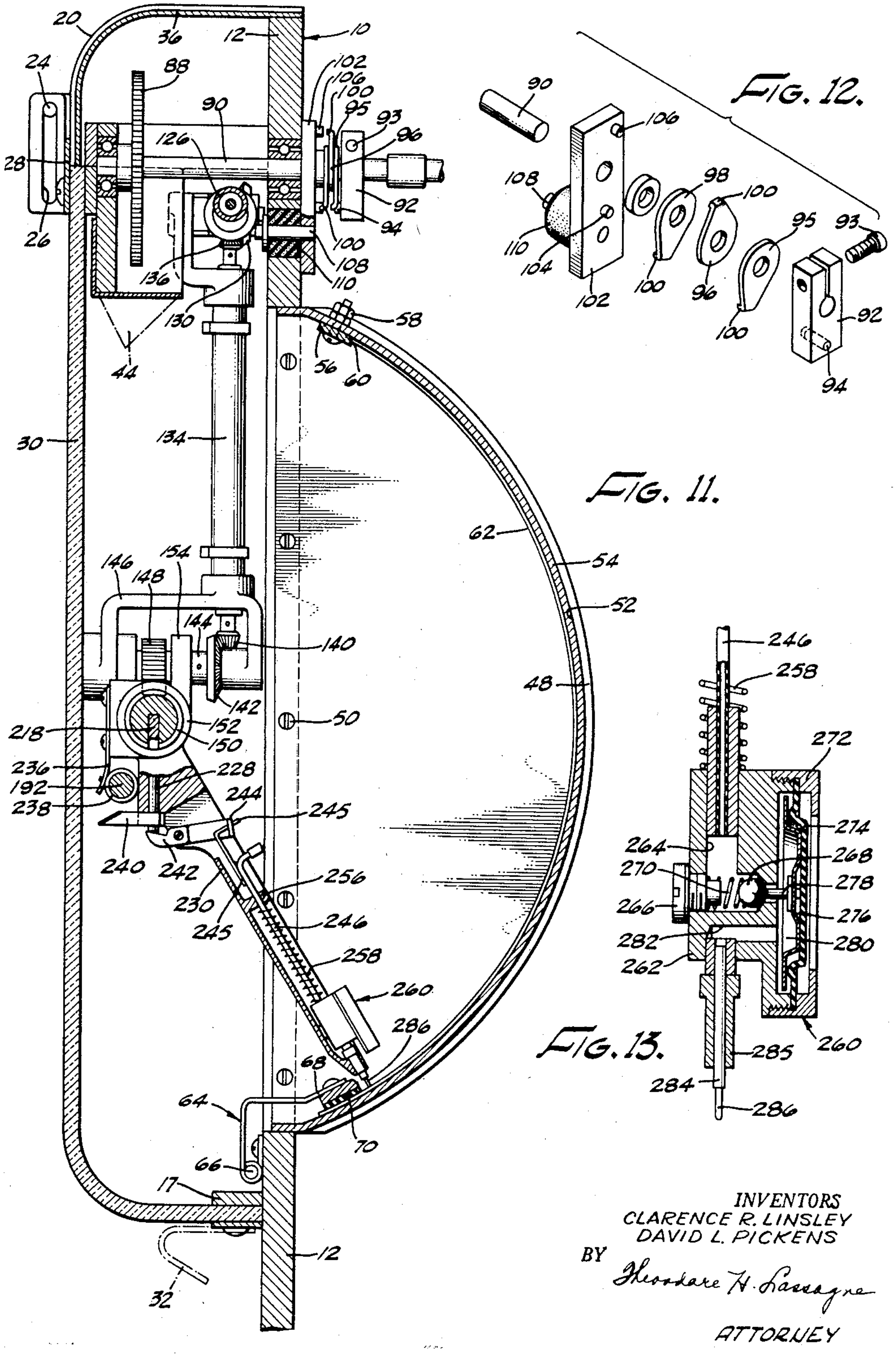
Figure 14:
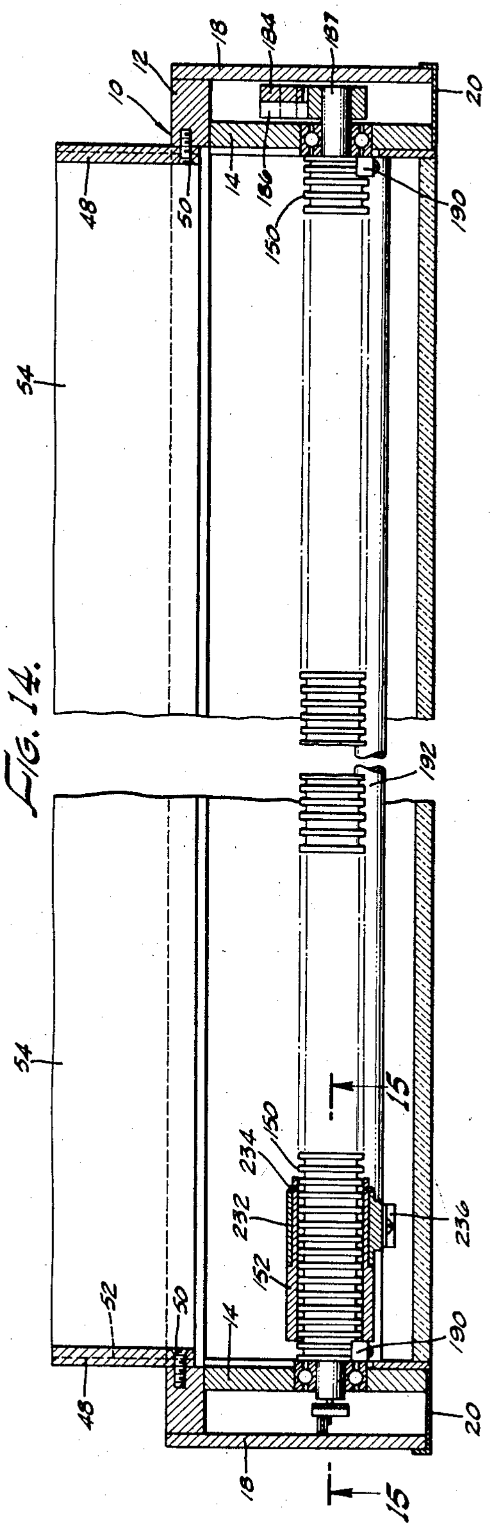
Figure 17:
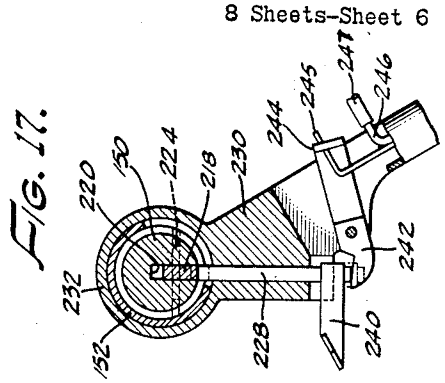
Figure 16:
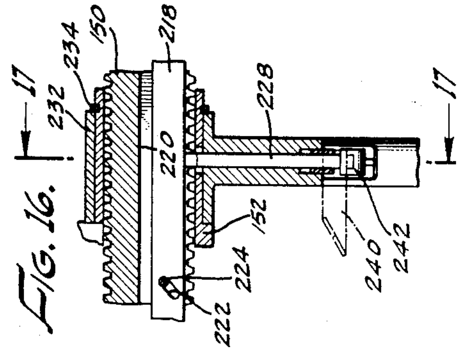
Figure 15:
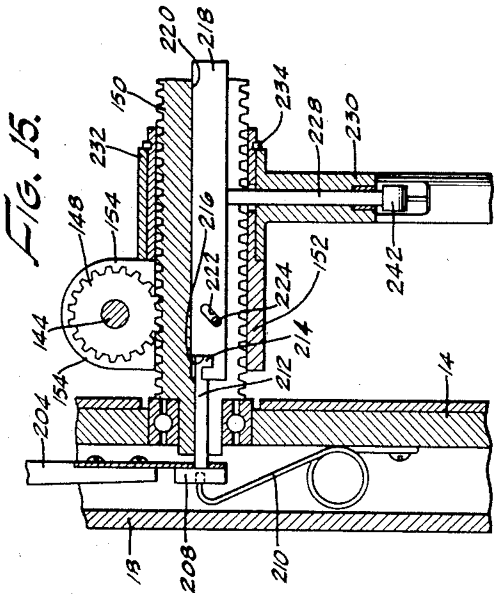

Figures 8 and 9 are enlarged sectional views substantially on the lines 8—8 and 9—9 of Figure 4 and illustrate in further detail certain features shown in Figure 4;

Figure 10 is a fragmentary sectional view taken substantially on the line 10—10 of Figure 9 and illustrates in further detail and on a reduced scale certain features shown in Figures 8 and 9;

Figure 11 is an enlarged sectional view taken substantially on the line 11—11 of Figure 4;

Figure 12 is an enlarged exploded perspective view of certain features shown in Figure 5;

Figure 13 is an enlarged sectional view illustrating in considerable detail certain features shown somewhat schematically in Figure 11;

Figure 14 is an enlarged sectional view taken substantially on the line 14—14 of Figure 4 and illustrates in further detail certain features shown in Figure 4;

Figure 15 is an enlarged fragmentary sectional view taken substantially on the line 15—15 of Figure 14 and illustrates in further detail certain features shown in Figure 14 in one positioning of these features;

Figure 16 is an enlarged fragmentary sectional view corresponding to Figure 15 and illustrates certain features shown in Figure 15 in a second positioning of these features;

Figure 17 is an enlarged fragmentary sectional view substantially on the line 17—17 of Figure 16 and illustrates the features shown in Figure 16 in the second positioning of these features.

Figure 18:
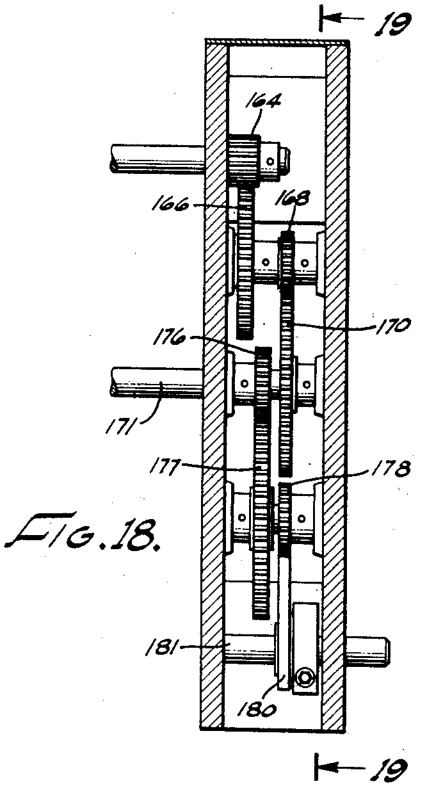
Figure 19:
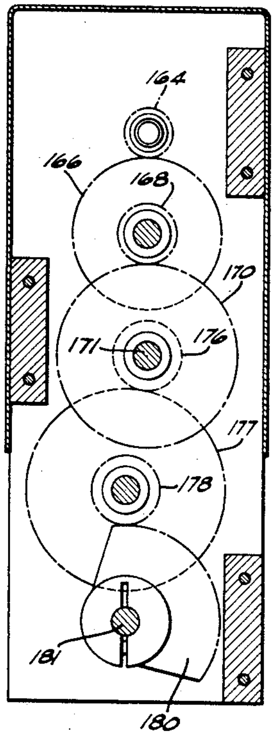
Figure 21:
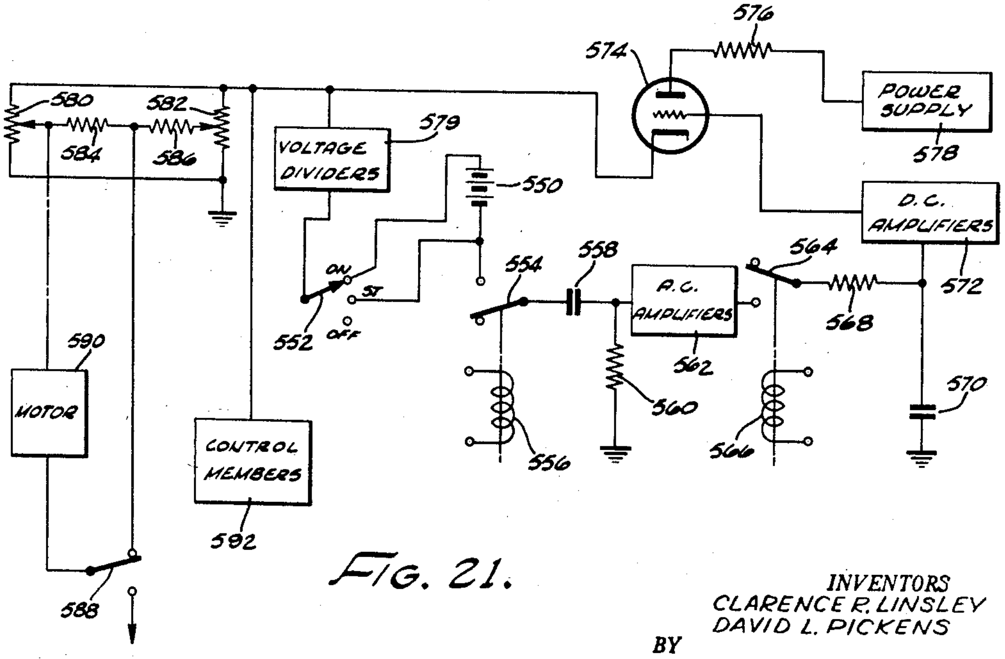
Figure 20:
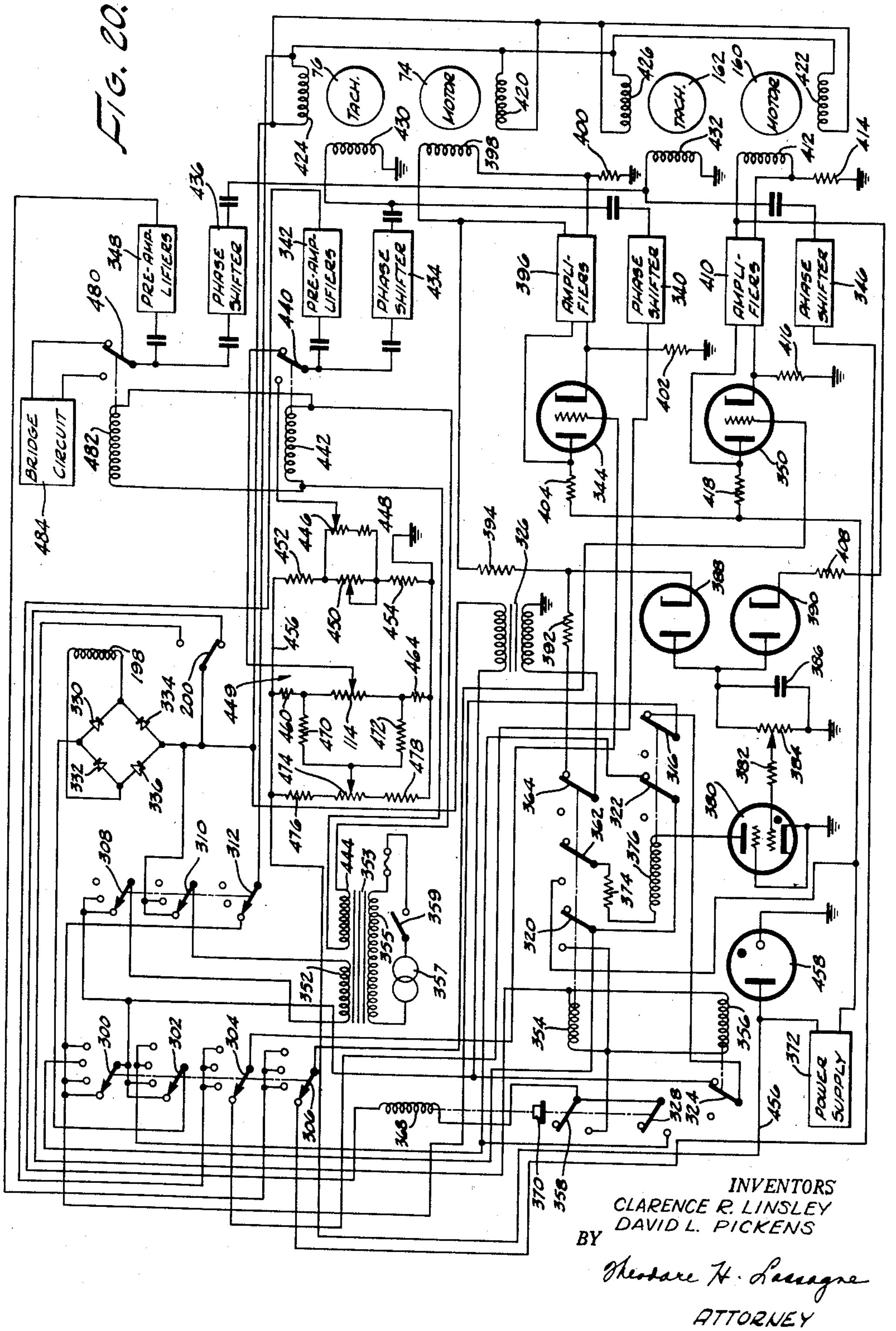

Figure 18 shows a gear train for operating certain of the features shown in Figure 8;

Figure 19 is an enlarged sectional view taken substantially on the line 19—19 of Figure 18 and illustrates in further detail the gear train shown in Figure 18;

Figure 20 shows, partly in block form, an electrical system which forms a part of the graph plotter shown in the previous figures; and Figure 21 is a circuit diagram somewhat schematically illustrating a modification in the system shown in Figure 20 when the system is to be used for plotting analogue quantities.

In the embodiment of the invention shown in the drawings, a chassis generally indicated at 10 (Figure 1) is provided. The chassis includes a support plate 12 (Figures 8, 9 and 11) which is inclined at an angle such as 45° to the horizontal or vertical. A pair of side plates 14 (Figures 1 and 4) extend upwardly from the support plate 12 at opposite ends of the support plate. Grooves 16 (Figure 3) are provided in bosses 17 at the bottom of the side plates 14 at positions adjacent the support plate 12.

Side covers 18 (Figures 1 and 4) extend upwardly from the support plate 12 in spaced relationship to the side plates 14. The side covers 18 are included to prevent the passage of dust into the apparatus and to present a pleasing external appearance. Straps 20 (Figure 1) having a substantially U shape are supported between each of the side plates 14 and the adjacent side cover 18.

Figures 1, 2, 3:
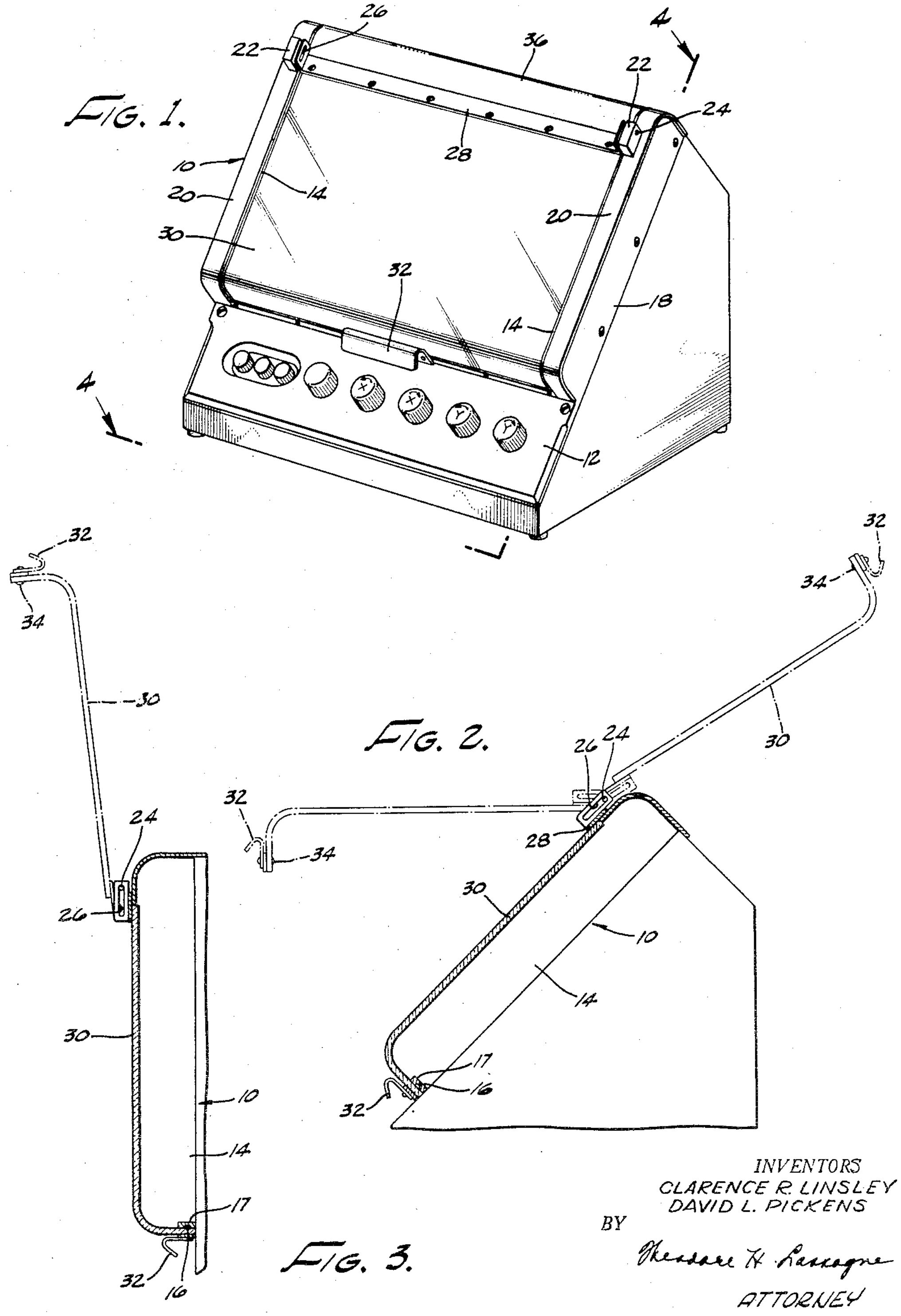
Figure 1 is an isometric view of the graph plotter as seen from a position above and in front of the plotter.
Figure 2 is an enlarged fragmentary section view which illustrates the apparatus shown in Figure 1 when the apparatus is suppotred on a desk or table and which further illustrates in solid lines a cover in its closed position and in broken lines the cover in partially and full opened positions.
Figure 3 is an enlarged fragmentary sectional view similar to Figure 2 and illustrates the appearance of the apparatus shown in Figure 1 when the apparatus is mounted on a wall, the cover being shown in solid lines in its closed position and being shown in broken lines in an open position.

Brackets 22 (Figure 1) are suitably secured to the straps 20 as by screws at a position near the tops of the straps. Pivot pins 24 (Figures 1, 2 and 3) extend through the brackets 22 in pivotable relationship to the brackets and also extend through slots 26 in upwardly turned flanges at the ends of a strip 28 (Figure 1). The strip 28 in turn supports as by screws a cover 30 (Figures 1, 2 and 3) which is made from a suitable transparent material such as a polymer of methyl methacrylate.

The cover 30 has a contour corresponding to that of the straps 20 as seen from the side and supports a handle 32 at its bottom end. At its bottom inner surface, the cover 30 is provided with detents 34 which extend upwardly to engage the grooves 16 in the side plates 14. In this way, the cover may be fixedly retained in closed position relative to the side plates 14 and the support plate 12 when the apparatus constituting this invention is operating to plot a graph. A top plate 36 (Figures 1 and 4) having a curved configuration as seen from the side is fastened as by screws to the top of the support plate 12 to form a substantially smooth surface with the cover 30. A bulb 42 (Figure 4) and a shield 44 (Figures 4 and 11) are suitably supported within the graph plotter at an intermediate position between the side plates 14. The shield 44 may be made from a translucent material or from a transparent material similar to the cover 30 and may be illuminated by the bulb 42. The name of the manufacturer or distributor may be etched or otherwise suitably disposed on the shield 44 for purposes of trade identification.

A pair of end plates 48 (Figures 10, 11 and 14) extend through slots in the support plate 12 at positions adjacent the side plates 14. The end plates 48 are suitably secured to the support plate 12 as by screws 50 (Figures 11 and 14) and are provided with a curved bottom surface having the configuration of a circular segment. A groove 52 is formed in each of the end plates 48 at a position contiguous to the bottom surface of the end plate. Each groove 52 is shaped substantially as a circular segment to receive a platen 54 (Figures 10 and 11) having substantially the shape of a cylindrical segment. By disposing the grooves 52 at corresponding positions in the end plates 48, the axis of the platen 54 is made to extend in a horizontal direction. The end plates 48 and the platen 54 may be cast from such materials as steel or aluminum.

A positioning strip 56 (Figures 4 and 11) is suitably secured to the platen 54 as by screw and nut combinations 58 and is disposed in a substantially horizontal direction at a position near the top of the platen. For reasons which will be disclosed in detail hereinafter, the positioning strip 56 is provided with a bevelled edge 60 (Figure 11) along its bottom surface to receive a chart 62 when the chart is slid upwardly into contact with the strip. The chart 62 may be of any suitable type, either lined or unlined.

The bottom of the chart 62 is retained in position by clamps 64 which rest on the chart at the bottom of the chart through the action of gravity. The clamps 64 are suitably secured as by screws to the support plate 12 and are formed from a spring-like material hinged as at 66. Each clamp then extends upwardly and rearwardly and supports members 68 and 70 as by screws at its upper rear end. The member 68 may be made from a suitable material such as steel to impart weight to the end of the clamps and the member 70 may be made from a suitable material such as sponge rubber to grip the chart lightly but firmly.

A servomotor 74 (Figure 5) is suitably supported by the plate 12 within the graph plotter at a rear position in the plotter. The motor 74 is mechanically coupled as by a common drive shaft to a tachometer 76. The motor 74 and the tachometer 76 may be purchased as a set from the Diehl Manufacturing Company of Finderne, New Jersey, under a type number of FPE–25–67–1 designated by that company. Certain electrical features of the servomotor 74 and the tachometer 76 will be disclosed in detail hereinafter.

The servomotor 74 drives a shaft 78 which carries a gear 80 in mesh with a gear 82 on a shaft 84. The gear 82 may have a suitable ratio such as a 6:1 tooth ratio to the gear 80 to slow the shaft 84 down relative to the speed of movement of the shaft 78. The shaft 82 also carries a gear 86 in mesh with a gear 88 on a shaft 90. The gear 88 may have a 3:1 tooth ratio to the gear 86.

A cam 92 (Figures 5 and 12) is positionably mounted as by a screw 93 (Figure 12) on the shaft 90 for rotation with the shaft and is provided with a pin 94 on its rear surface. Washers 95, 96 and 98 are loosely mounted on the shaft and are formed with ears 100 on their outer peripheries. The ear 100 on the washer 95 is shaped so as to be engaged by the pin 94 as the cam 92 rotates and to follow the movement of the cam thereafter. The ears 100 on the washers 96 and 98 are similarly shaped to be engaged by the ears on the washers 95 and 96, respectively, after the washers 95 and 96 have rotated through substantially a complete revolution.

A stop plate 102 is also loosely mounted on the shaft 90. A stop pin 104 is disposed on the stop late 100 to engage the ear 100 on the washer 98 after the shaft 90 has rotated through a particular angular distance in one direction. Similarly, a stop pin 106 is disposed on the stop plate 100 to limit the angular rotation of the shaft 90 in the other direction by engaging the ear 100 on the washer 98. A pin 108 extends through the stop plate 100 at the opposite end of the plate from the shaft 90 and supports a shock absorber 110 made from a suitable material such as rubber.

The shaft of a precision wound potentiometer 114 (Figure 5) is fixedly coupled to the shaft 90. The electrical characteristics of the potentiometer 114 will be disclosed in detail hereinafter. A wobble plate 116 is attached at one end to the potentiometer 114 and at the other end to a stud 118 suitably secured to the support plate 12. The wobble plate 116 permits the shaft of the potentiometer 114 to rotate and to move laterally but prevents the potentiometer from binding.

The shaft 84 carries a bevel gear 120 (Figures 5, 6 and 7) as well as the members disclosed above. A pinion 122 is in mesh with the bevel gear 120 and drives a shaft 124. The shaft 124 is positioned within an arm 126, which has a tongue pivotably mounted on the shaft 84. A planet gear 128 is fixedly mounted on the shaft 124 at the opposite end of the shaft from the pinion 122. The planet gear 128 drives a sun gear 130 loosely mounted on a pin 132, which extends through tongues on the arm 126 and on an arm 134 (Figure 11) to couple the arms in pivotable relationship to each other.

The sun gear 130 drives a planet gear 136 which is fixedly mounted on a shaft 138 positioned within the arm 134. The planet gear 136 has a 1:1 tooth ratio with the planet gear 128. A pinion 140 (Figures 6, 7 and 11) is carried by the shaft 138 at the opposite end from the planet gear 136 and is in mesh with a bevel gear 142. The pinion 140 and the bevel gear 142 have a tooth ratio corresponding to the tooth ratio between the pinion 122 and the bevel gear 120.

The bevel gear 142 drives a shaft 144 having a yoke 146 (Figure 11) of the arm 134 pivotably mounted on it. A pinion 148 is fixedly positioned on the shaft 144 for rotation with the shaft. The pinion 148 is in mesh with a cylindrical rack 150 having a plurality of teeth separately formed on it at spaced intervals in perpendicular relationship to the cylindrical axis of the rack. The rack 150 is journalled in the side plates 14 so as to extend horizontally along the axis of the cylindrical segment formed by the platen 54. A sleeve 152 is disposed on the rack 150 in slidable relationship to the rack. The sleeve 152 has at one end a yoke portion 154 pivotably mounted on the shaft 144 for support.

In addition to the servomotor 74 and the tachometer 76, a servomotor 160 (Figure 5) and tachometer 162 are suitably supported within the graph plotter constituting this invention. The servomotor 160 and the tachometer 162 may respectively correspond substantially to the servomotor 74 and the tachometer 76 disclosed above. The motor 160 drives a gear 164 (Figures 18 and 19) in mesh with a gear 166 having a 6:1 tooth ratio with respect to the gear 164. A gear 168 having a common shaft with the gear 166 in turn drives a gear 170 fixedly mounted on a shaft 171 and having a 3:1 tooth ratio with the gear 168. A precision wound potentiometer 172 (Figure 5) is disposed on the shaft 171 and is provided with electrical characteristics which will be disclosed in detail hereinafter. A wobble plate 173 corresponding to the wobble plate 116 is associated with the potentiometer 172 to limit any tendency for the potentiometer to bind when it is driven by the motor 160. The shaft 171 also carries a stop formed from members corresponding to the cam 92, the washers 95, 96 and 98, the stop plate 102 and the shock absorber 110 shown in the drawings and disclosed above. A pin 174 and a shock absorber 175 corresponding to the pin 108 and the shock absorber 110 in Figure 12 are shown in a cut-away portion of Figure 5.

A gear 176 (Figures 18 and 19) is on the same shaft as the gear 170 and is in mesh with a gear 177, the tooth ratio between the gears 177 and 176 being 3:1. A gear 178 is on the same shaft as the gear 177 and drives a gear sector 180 mounted on a shaft 181 (Figures 8, 18 and 19). The gear sector 180 would have a 3:1 tooth ratio with the gear 178 if it were a full gear. A linkage 182 (Figures 4 and 8) pivots about the same axis as the axis of rotation of the gear sector 180 and drives a rod 184 at its free end. The bottom of the rod 184 is in turn coupled to the pivoting end of a linkage 186 corresponding to the linkage 182. The linkage 186 is mounted at its other end for pivotal movement on a spindle portion 187 (Figures 4 and 8) which extends from the rack 150 in the region between the side plate 14 and the side cover 18 at the right side of the apparatus constituting this invention.

Couplings 190 (Figure 4) are suitably attached at one end as by screws to shoulders on the rack 150 at positions slightly interior to the side plates 14. At their other end, the couplings 190 are disposed on shoulders in a guide rail 192 and are fixedly positioned relative to the guide rail as by taper pins 194 extending through the couplings and the guide rail. The guide rail 192 may have a cylindrical configuration in vertical cross-section and may extend horizontally in a direction substantially parallel to the rack.

A solenoid 198 (Figure 4) is disposed within the graph plotter near the top of the plotter. The solenoid 198 is adapted when energized to actuate the movable contact of a microswitch 200 from a first stationary contact to a second stationary contact. The solenoid 198 is also adapted to actuate an armature 202 (Figures 4 and 9) pivotably attached as by a pin to the top end of a rocker arm 204. An actuating rod 205 extends from the rocker arm 204 to control the opening and closing of the microswitch 200 in accordance with the actuation of the armature 202. The rocker arm is pivotable on a pivot pin 206 at an intermediate position and is attached at its lower end to a retracting member 208 (Figures 4, 9 and 15). At its bottom end, the retracting member 208 has a socket which receives the free end of a spring 210 in somewhat constrained relationship.

An actuator bar 212 (Figure 15) is attached to the retracting member 208 at a position contiguous to the point of contact between the retracting member and the leaf spring 210. The actuator bar 212 extends horizontally inwardly from the retracting member 208 and has at its inner end a lug 214 which extends upwardly into a detent 216 in a cam bar 218. The cam bar 218 extends horizontally through the rack 150 in a vertical slot 220 in the rack. A pair of inclined slots 222 are provided in the cam bar 218 at opposite extremities of its length. Pins 224 extend into the slots 222 from sockets in rack 150.

The cam bar 218 is positioned above a plunger 228 in a stylus retainer 230. The retainer 230 extends from a collar 232 loosely carried on the cylindrical portion of the sleeve 152 at the right end of the sleeve. The collar 232 is maintained in fixed lateral position on the sleeve 152 as by shims and a snap ring 234 fitting into a socket in the sleeve. A spring clip 236 (Figure 11) is attached as by screws to the collar 232 at one end and is disposed at the other end to press downwardly on the top of bushing 238. The bushing 238 is mounted on the guide rail 192 in slidable relationship to the guide rail. A handle 240 extends laterally outwardly from the plunger 228. As will be disclosed in detail hereinafter, the handle is adapted to be actuated manually for depressing the plunger 228, the bottom surface of which is slidable on the top surface of a lever arm 242.

The lever arm 242 (Figures 11 and 17) is pivotable at an intermediate position such that the length to the right of the pivot point is substantially twice as long as the length to the left of the pivot line. The lever arm 242 has at its right end a lip portion 244 which receives a tang 245 extending through a hole in the lip portion. The tang 245 is bent into a substantially inverted L-shape and is attached at the bottom to a tube 246 made from a suitable material such as stainless steel. The tang 245 may be made from a suitable material such that it can be bent and retained in its bent shape. By such bending, the vertical leg of the tang 245 can be adjusted in length to provide an optimum setting of pen point to chart.

The tube 246 may have an outer diameter such as approximately 0.030 inch and an inner diameter such as approximately 0.020 inch. A tube 247 made from a suitable material such as a vinyl plastic fits on the tube 246. The tube 247 (Figure 4) may extend along the arms 134 and 126 in fixed position relative to the arms as by clips 248. At its upper end, the tube 247 extends through a hole in the top of a bottle 250 or other container holding ink 252 or other suitable marking fluid. A vent line 254 made from tubing similar to the tube 247 extends from the bottle 250 and communicates with the atmosphere at its outer end.

The tube 246 extends downwardly through a slot in a shoulder 256 forming a part of the retainer 230. A helical spring 258 (Figures 11 and 13) is wrapped around the tube 246 in compressed relationship between the shoulder 256 and the top of a regulator generally indicated at 260. The tube 246 extends through a body member 262 (Figure 13) in the regulator and communicates with a hole 264 in the body member. The hole 264 is threaded at the bottom to receive a plug 266 and is tapered at the top to form a seat for receiving a ball 268. The ball 268 is pressed against the seat by a spring 270 maintained in constrained relationship between the ball and the plug 266.

The body member 262 is externally threaded to receive a cap 272. A flexible diaphragm 274 is positioned between the cap 272 and the body member 262 and is in communication with the atmosphere. The diaphragm 274 in turn presses against a pressure plate 276 having a downwardly extending pin 278 in contact with the ball 268. A well 280 is formed between the diaphragm 274 and the body member 262 to receive the ink 252. The ink 252 is then adapted to flow through a conduit 282 and a tube 284, in communication with the conduit. The tube 285 is maintained in fixed position by a bushing 285 supported by the retainer 230. The tube 284 may correspond in characteristics to the tube 246 and carries a stylus 286 having an outer diameter such as approximately 0.015 inch and an inner diameter such as approximately 0.008 inch. The ink 252 is adapted to flow through the stylus 286 to make marks on the chart 62 when the stylus contacts the chart.

The servomotors 74 and 160, the tachometers 76 and 162, the potentiometers 114 and 172, the solenoid 198 and the microswitch 200 described above are included in the electrical system shown in Figure 20. Ganged switches 300, 302, 304 and 306 and ganged switches 308, 310 and 312 are also included in the electrical system. Each of the ganged switches 300, 302, 304 and 306 has a movable contact and four stationary contacts. Similarly, each of the ganged switches 308, 310 and 312 has a movable contact and three stationary contacts. For purposes of convenience, the stationary contact of each switch in the extreme counterclockwise position will be designated as the first stationary contact of the switch. Successive stationary contacts on each switch in a clockwise direction will be designated as the second, third and fourth stationary contacts of the switch.

The first, second and fourth stationary contacts of the switch 300 are connected to the first stationary contact of the switch 312 and to the movable contact of a switch 316. The third stationary contact of the switch 300 has a common terminal with the movable contact of a switch 320 and the movable contact of a switch 322 ganged to the switch 316. A connection is made from the movable contact of the switch 300 to the first and second stationary contacts of the switch 302, to the first and second stationary contacts of the switch 308, to the right stationary contact of a switch 324 and to one terminal in the primary winding of a transformer 326.

The third and fourth stationary contacts of the switch 302 are connected to the bottom stationary contact in a switch 328 and to the right stationary contact in the switch 322. The voltage on the movable contact of the switch 302 is applied to the plate of a diode 330 and the cathode of a diode 332 included in a bridge with diodes 334 and 336. Connections are made from the plates of the diodes 332 and 336 to one terminal of the solenoid 198 and from the cathodes of the diodes 330 and 334 to the other terminal of the solenoid.

The first stationary contact of the switch 304 has voltage applied to it from an output terminal of a phase shifter 340 which may be formed from a combination of resistances and capacitances or inductances in a conventional manner. Voltages are applied to the second, third and fourth stationary contacts in the switch 304 from pre-amplifiers indicated in block form at 342 and constructed in a conventional manner. The movable contact of the switch 304 is connected to the grid of a tube 344 which may be a type 12UD7.

Similarly, voltage is applied to the first stationary contact in the switch 306 from a phase shifter 346 corresponding to the phase shifter 340. The second, third and fourth stationary contacts of the switch 306 have voltages applied to them from preamplifiers indicated in block form at 348 and corresponding in construction to the pre-amplifiers 342. A connection is made from the movable contact of the switch 306 to the grid of a tube 350 corresponding to the tube 344.

The movable contact of the switch 308 is connected to one terminal of a secondary winding 352 in a transformer 353. The other terminal of the secondary winding 352 is connected to the movable contact of the switch 310, the first and second stationary contacts of which are connected to the plate of the diode 334 and the cathode of the diode 336. The secondary winding of the transformer 352 has voltage induced in it from a primary winding 355 in series with a source 357 of alternating voltage and a manually operated master switch 359.

As previously disclosed, the operation of the microswitch 200 is controlled by the solenoid 198. The movable contact of the microswitch 200 is connected to the first and second stationary contacts of the switch 310 and to the second terminal in the primary winding of the transformer 326. Voltage is applied from the upper terminal of the microswitch 200 as seen in Figure 20 to one terminal of relay windings 354 and 356. The relay windings 354 and 356 have their other terminal connected to the bottom stationary contact of a switch 358 as seen in Figure 20 and to the left stationary contact of the switch 320. The relay winding 354 is adapted to control the positioning of the movable contact in the switch 320 and the positioning of the movable contacts in switches 362 and 364 ganged to the switch 320. Similarly, the relay winding 356 is adapted to control the operation of the switch 324.

A connection is made from the bottom stationary contact of the microswitch 200 as seen in Figure 20 to one terminal of a relay winding 368 having its other terminal connected to the movable contacts of the switches 328 and 358. The relay winding 368 is adapted when energized to actuate the movable contacts of the ganged switches 328 and 358 into engagement with the upper stationary contacts of the switches. As seen in Figure 20, the engagement between the movable contacts of the switches 328 and 358 and their lower stationary contacts is controlled by a button 370, which may be either manually or mechanically operated.

The left stationary contact of the switch 362 as seen in Figure 20 has voltage applied to it from a power supply indicated in block form at 372. The movable contact of the switch 362 is in series with a resistance 374 and a relay winding 376 adapted to control the operation of the ganged switches 316 and 322. The right stationary contact of the switch 316 has a common terminal with the movable contact of the switch 324.

The solenoid 376 is connected to the plate of a thyratron tube 380 which may be a type 2D21 and which has its cathode and suppressor grid grounded. Voltage is applied to the grid of the thyratron tube 380 through a resistance 382 from the movable contact of a potentiometer 384. The resistance 382 may have a value such as 270,000 ohms and the potentiometer 384 may have a value such as 1 megohm. One stationary contact of the potentiometer 384 is grounded and the other contact is connected to the ungrounded terminal of a grounded capacitance 386 having a suitable value such as 0.25 microfarad. Connections are also made from the ungrounded stationary contact of the potentiometer 384 to the plates of diodes 388 and 390.

A resistance 392, the right stationary contact and movable contact of the switch 364 and the secondary winding of the transformer 326 extend in a series circuit from the cathode of the diode 388 to ground when the movable contact of the switch 364 engages the right stationary contact as seen in Figure 20. The resistance 392 may have a suitable value such as 10,000 ohms. Voltage is applied to the cathode of the diode 388 through a resistance 394 from an output terminal of amplifiers indicated in block form at 396 and formed from conventional stages.

The amplifiers 396 have two output terminals, the voltage from which is applied to a coil 398 forming a part of the servomotor 74. The ungrounded terminal of a resistance 400 having a suitable value such as 1,000 ohms is connected to the second output terminal in the amplifiers 396. Input voltages to the amplifiers 396 are respectively applied from the plate and cathode of the diode 344. A grounded resistance 402 is connected to the cathode of the tube 344 and a resistance 404 is connected between the plate of the tube and the power supply 372. The resistances 402 and 404 may have suitable values such as approximately 130,000 ohms.

Similarly, the cathode of the diode 390 has voltage applied to it through a resistance 408 from an output terminal of amplifiers indicated in block form at 410. The amplifiers 410 correspond to the amplifiers 396 and have two output terminals, the voltages from which are applied to a winding 412 in the motor 160. A grounded resistance 414 corresponding in value to the resistance 400 is connected to one of the output terminals in the amplifiers 410. The amplifiers 410 have a pair of input terminals which receive voltages from the cathode and plate of the tube 350. A grounded resistance 416 is connected to the cathode of the tube 350 and a resistance 418 is connected between the plate of the tube 350 and the power supply 372. The resistances 416 and 418 have values corresponding to the resistances 402 and 404.

In addition to the windings 398 and 412, the servomotors 74 and 160 respectively have second windings 420 and 422. The windings 420 and 422 are in parallel with corresponding windings 424 and 426 in the tachometers 76 and 162, respectively. The windings 420, 422, 424 and 426 have one terminal connected to the first and second stationary contacts of the switch 310 and the other terminal connected to the movable contact of the switch 312.

The tachometers 76 and 162 also have windings 430 and 432 corresponding to the windings 398 and 412 in the motors 74 and 160, respectively. The windings 430 and 432 have one terminal grounded. The other terminal of the winding 430 is connected through suitable coupling capacitances to the output terminal of the phase shifter 340 and to an output terminal of a phase shifter 434. Similarly, the second terminal of the winding 432 is connected through suitable coupling capacitances to an output terminal of the phase shifter 346 and to an output terminal of a phase shifter 436.

The phase shifter 434 and 436 may be formed from a combination of resistances and capacitances or inductances in a conventional manner. The phase shifter 434 and the pre-amplifiers 342 have voltages applied to them through suitable coupling capacitances from the movable contact of a switch 440. The movable contact of the switch 440 is controlled in positioning by the operation of a coil 442 adapted to receive voltage from a secondary winding 444 in the transformer 353. The left stationary contact in the switch 440 as seen in Figure 20 has voltage applied to it from the movable contact of a potentiometer 446 in series with a resistance 448. The potentiometer 446 and the resistance 448 form part of a bridge circuit indicated generally at 449. Although the potentiometer 446 and the resistance 448 are included in the system shown in Figure 20, it should be appreciated that these resistive members may form a part of apparatus operating in conjunction with the graph plotter to determine the values recorded by the plotter. The potentiometer 446 and the resistor 448 are in parallel with a rheostat 450 having its movable contact connected to one of its stationary contacts and having a full value such as 20,000 ohms. The rheostat 450 is in series in a symmetrical relationship with resistances 452 and 454 each of which may have a value such as 5,000 ohms. One terminal of the resistance 454 is grounded and one terminal of the resistance 452 has voltage applied to it through an output line 456 from the power supply 372. A voltage regulator tube 458 is connected between the line 456 and ground to regulate the voltage on the line 456 at a suitable positive value such as 100 volts.

A resistance 460, the potentiometer 114 and a resistance 464 are in series between the line 456 and ground. The resistances 460 and 464 may each have values of approximately 18,500 ohms and the potentiometer 114 may have a value of approximately 10,000 ohms. The movable contact of the potentiometer 114 is connected to the right stationary contact of the switch 440 as seen in Figure 20.

Resistances 470 and 472 form a series circuit across the potentiometer 114. The resistances 470 and 472 may have values of approximately 560 ohms. The common terminal between the resistances 470 and 472 is connected to the movable contact of a potentiometer 474, which is in series with resistances 476 and 478 between the line 456 and ground. Each of the resistances 476 and 478 may have a value of approximately 3,900 ohms and the potentiometer may have a full value of approximately 20,000 ohms.

In like manner, the pre-amplifiers 348 and the phase shifter 436 have voltages applied to them through suitable coupling capacitances from the movable contact of a switch 480. The movable contact of the switch 480 is positioned in accordance with the operation of a coil 482 corresponding to the coil 442 and connected to the secondary winding 444 in the transformer 353. The left and right stationary contacts of the switch 480 as seen in Figure 20 have voltages applied to them from a bridge circuit indicated in block form at 484. The bridge circuit 484 corresponds to the bridge circuit 449 and the output leads from the bridge circuit correspond to the connections from the movable contacts of the potentiometers 446 and 114 in the bridge circuit 449.

To assemble the apparatus disclosed above, the required dowels and pins are first pressed into the support plate 12. The end plates 48 (Figure 11) and the platen 54 are next temporarily attached to the base plate 12 for purposes of alignment. The side plates 14 are then attached to the base plate 12, and, after the side plates 48 and the platen 54 have been removed, the side plates 14 are screwed firmly into space. The side plates 48 and the platen 54 are next re-attached to the base plate 12.

As the following step, the gear train including the gears (Figures 18 and 19) 164, 166, 168 and 170 are properly positioned within the graph plotter. The rack assembly including the rack 150 (Figure 15), the cross bar 218 and the pins 224 is next disposed on the side plates 14 for support. The assembly including the gears (Figure 5) 80, 82, 86, 88, the arms 126 and 134, the sun gear 130 and the planet gears 128 and 136 are subsequently properly positioned in the graph plotter. Following this, the pen holder assembly including the retainer 230 (Figure 11) and the members supported by and disposed within the retainer are attached to the rack assembly.

The linkage assembly including the linkages 182 (Figure 8) and 186 and the rod 184 is then properly inserted on the graph plotter to couple the gear sector 180 to the rack 150. The members including the solenoid 198 (Figures 4 and 9) the microswitch 200, the rocker arm 204, the retracting member 208 and the actuator bar 212 are subsequently inserted into position. The stop including the pin 174 and the shock absorber 175 and the stop formed by the cam 92, the washers 95, 96 and 98 and the stop plate 102, the potentiometers 114 and 172, and the servomotors 74 and 160 and the tachometers 76 and 162 are thereafter mounted within the graph plotter.

After the steps disclosed above have been performed, the clamps 64 (Figure 11) are installed and the guide rail 192 (Figure 4) is properly disposed between the side plates 14. Members including the bottle 250, the vent line 254, the tubing 247 and the stylus 286 are subsequently inserted into position. As a final step, the packages formed by the electrical components shown in Figure 20 are secured in place in the chassis 10 in the space beneath the support plate 12.

When the graph plotter disclosed above is placed into operation for the first time, the open end of the stylus 286 is initially covered by a wiping cloth (not shown). Air is then blown into the open end of the vent line 254 (Figure 4) to create a pressure for producing a rapid movement of the ink 252 in the bottle 250 through the vinyl tubing 247 and into the regulator 260. At the same time that air is blown into the open end of the vent line 254, the diaphragm 274 (Figure 13) is manually depressed. This causes the pin 278 on the pressure plate 276 to move the ball 268 away from its seat so that the ink 252 is able to enter into the well 280 between the diaphragm 274 and the body member 262. In this way, the well 280 can be quickly filled with ink. By maintaining the wiping cloth over the opening in the stylus 286, the wiping cloth is able to absorb any ink that may flow through the conduit 282 and the tube 284 during the process of initial filling.

When the movable contacts of the switches 308 (Figure 20), 310 and 312 engage the third stationary contacts of the switches, no voltage is applied through any of the switches to most of the components in the system shown in Figure 20. Upon a counter-clockwise rotation of the movable contacts of the switches 308, 310 and 312 into engagement with the second stationary contacts of the switches, voltage is applied from the secondary winding 352 of the transformer 353 to certain components in the system shown in Figure 20 provided that the switch 359 has been manually closed. For example, voltage is applied to the transformer 326, and voltage is also applied to the filaments of all of the tubes in the various stages through circuits which are not shown for purposes of convenience. However, no voltage is applied to the windings 420, 422, 424 and 426 to render the motors 74 and 160 and the tachometers 76 and 162 operative. In this way, the second positions of the switches 308, 310 and 312 constitute the "stand-by" positions to prepare the graph plotter for operation, but no graph is actually plotted.

When the movable contacts of the switches 308, 310 and 312 are pivoted in a counter-clockwise direction into engagement with the first stationary contacts of the switches, voltage is applied to the various components in the system shown in Figure 20 to energize these components for operation. For example, voltage is applied to the windings 420, 422, 424 and 426 through a circuit including the secondary winding 352, the movable and first stationary contacts of the switch 310, the windings, the movable and first stationary contacts of the switch 312, the switch 300 in certain positions of the switch and the first stationary and movable contacts of the switch 308.

By pivoting the movable contacts of the switches 300, 302, 304 and 306 in a counterclockwise direction into engagement with the first stationary contacts of the switches, the graph plotter disclosed above is placed in a state of operation known as "load." In this state of operation, the signals produced by the tachometer 76 are shifted in phase by the phase shifter 340 and are applied in phase-shifted form to the first stationary contact of the switch 304. The phase-shifted signals then pass through the first stationary and movable contacts of the switch 304 to the grid of the tube 344.

The signal applied to the grid of the tube 344 produces a corresponding flow of current through the tube and corresponding voltage drops across the resistances 402 and 404. Because of the voltages produced across the resistances 402 and 404, the signal produced on the plate of the tube has an opposite phase to the signal produced on the cathode of the tube. These signals are amplified by the amplifiers 396 and introduced to the winding 398 in the motor 74. As previously disclosed, voltage is applied to the winding 420 in the motor 74 when the movable contacts of the switches 308, 310 and 312 have been rotated to their extreme counterclockwise position and when the movable contacts of the switches 300, 302, 304 and 306 engage certain stationary contacts. Such a continuous circuit is established when the movable contacts of the switches 300, 302, 304 and 306 engage their first stationary contacts.

The voltage applied to the winding 398 is controlled in phase relative to the voltage applied to the winding 420 to produce a rotation of the motor 74. This rotation of the motor is damped somewhat by the tachometer 76 as a result of the action of the tachometer and the phase shifter 340. The rotation of the motor 74 produces a proportionate rotation of the gears 80 and 82 (Figures 5, 6 and 7), the bevel gear 120, the pinion gear 122, the planet gear 128, the sun gear 130, the planet gear 136, the pinion 140 and the bevel gear 142. Rotation of the bevel gear 142 in turn causes the pinion 148 to move along the rack 150 (Figure 15). This movement is in a direction to return the pinion 148 and the arm 134 to a position at the extreme left side of the rack 150. This position may correspond to a value of "0" for one of the quantities to be plotted. The pinion 148 moves towards the "0" position because of the particular phase difference between the voltage applied to the windings 398 and 420.

As the shaft 90 rotates, the cam 92 mounted on the shaft rotates with it until the pin 94 on the cam engages the ear 100 on the washer 95 loosely mounted on the shaft. Continued rotation of the shaft 90 causes the cam 92 to drive the washer 95. When the washer 95 has rotated through a particular angular distance, the ear 100 on the washer engages the ear on the washer 96 and thereafter drives the washer 96 with it. In like manner, the washer 96 engages the washer 98 after rotating through a particular angular distance and thereafter drives the washer 98 with it.

After the washer 98 has rotated through one revolution, the ear 100 on the washer engages the stop pin 104 on the stop plate 102. This prevents the washers 95, 96 and 98 from rotating any further and in turn prevents the motor 74 from driving any of its associated members including the potentiometer 114 (Figure 4), the arms 126 and 134 and the pinion 148. The absorption of the energy resulting from the stopping of such members as the shaft 90, the cam 92 and the washers 95, 96 and 98 is effectuated by the action of the shock absorber 110. In this way, the servomotor 74 (Figures 5 and 20) is prevented from moving the pinion 148 past the "0" position in the axial direction.

The tachometer 76 also acts to prevent the movement of the pinion 148 past the "0" position in the axial direction. The tachometer acts in this manner because of the damping action it exerts on the operation of the motor 74. This damping action results from the operation of the phase shifter 340 (Figure 20) in introducing to the winding 398 a signal having a particular phase relative to the phase of the signal introduced to the winding 420.

In like manner, the phase shifter 346 produces signals which pass through the first stationary and movable contacts of the switch 306 to the grid of the tube 350. These signals cause pairs of signals having a 180° phase relationship to one another to be produced on the plate and cathode of the tube 350 for introduction to the coil 412. The particular phase relationship between the voltages in the coils 412 and 422 produces a rotation of the motor 160. The rotation of the motor 160 is damped by the tachometer 162 as a result of the action of the tachometer and the phase shifter 346.

As the motor 160 rotates, it drives the gears 164 (Figures 18 and 19), and 166, 168 and 170, 176 and 177 and the gear sector 180 on the shaft 181. The gear sector 180 in turn drives the linkage 182 (Figure 8), the rod 184 and the linkage 186. The linkage 186 produces a corresponding pivotal movement of the rack 150 in Figure 11. The couplings 190 (Figure 4) rotate with the rack 150 and in turn drive the guide rail 192 in the same direction. The guide rail 192 presses against the spring 236 (Figure 11) and causes the spring 236 to move the retainer 230.

Since the stylus 286 is secured to the retainer 230, it follows the movement of the retainer and returns to the position representing a value of "0." The rack 150, the guide rail 192, the retainer 230 and the stylus 286 are prevented by the stop including the pin 174 and the shock absorber 175 (Figure 5), from rotating past a position representing a value of "0." The pivotal movement of the stylus 286 is independent of any simultaneous axial movement of the stylus because of the pivotable relationship between the sleeve 152 and the collar 232. Furthermore, the pivotal movement of the rack 150 and the stylus 286 does not produce any error in the axial direction since each of the teeth on the rack is separate from the adjacent teeth and is perpendicular to the axis of the rack.

During the time that the stylus is returning to its "0" position, the solenoid 198 (Figures 4 and 20) becomes energized. The solenoid becomes energized through a circuit including the secondary winding 352 (Figure 20), the movable and first stationary contacts of the switch 308, the first stationary and movable contacts of the switch 302, the bridge formed by the diodes 330, 332, 334 and 336 and the first stationary and movable contacts of the switch 310. The bridge formed by the diodes 330, 332, 334 and 336 operates to rectify the voltage from the secondary winding 352 before it is introduced to the solenoid 198.

When the solenoid 198 becomes energized, it actuates the armature 202, which moves towards the right in Figure 4. The armature 202 carries the rocker arm 204 (Figures 4 and 9) with it such that the rocker arm pivots on the pin 206 in a clockwise direction in Figure 9. This causes the bottom end of the rocker arm 204 to move to the left in Figures 4 and 15 and to carry the retracting member 208 and the actuator bar 212 with it against the action of the spring 210. As the actuator bar 212 moves to the left in Figures 4 and 15, the lug 214 engages the slot 216 in the cam bar 218 and moves the cam bar to the left in Figure 15. Because of the action of the pin 224 in the rack 150 and the slots 222 in the cam bar 218, the cross bar moves downwardly in Figure 15 as it moves to the left. The position of the cam bar 218 after its downward movement is shown in Figures 16 and 17.

As the cam bar 218 moves downwardly through the slot 220 in the rack 150, it pushes against the plunger 228 and moves the plunger with it. The plunger 228 in turn presses down on the lever arm 242 and causes the lever arm to pivot in a counterclockwise direction in Figures 11 and 17. As a result of this movement the lever arm 242 carries the tang 245 and the tubing 246 upwardly in Figures 11 and 17 against the action of the spring 258. The regulator 260 and the stylus 286 move upwardly with the tubing 246. In this way, the stylus 286 becomes withdrawn from the chart 62 (Figure 11) during the time that it is being returned by the motors 74 and 160 to its "0" position. Since the stylus 286 is withdrawn from the chart 62, no marks can be made on the chart.

When the movable contacts of the switches 300, 302, 304 and 306 are rotated into engagement with the second stationary contacts of the switches, the switches place the system disclosed above into a state of operation known as "Calibrate." In this state of operation, the windings 420, 422, 424 and 426 become energized through a circuit including the secondary winding 352, the movable and first stationary contacts of the switch 308, the movable and second stationary contacts of the switch 300, the movable and first stationary contacts of the switch 312, the windings 420, 422, 424 and 426 and the first stationary and movable contacts of the switch 310. By energizing the windings 420, 422, 424 and 426, the motors 74 and 160 and the tachometers 76 and 162 become prepared for operation.

As shown in Figure 20, the coil 442 is energized to receive a relatively low voltage such as approximately 6 volts during the time that the transformer 353 is operative. During the positive half cycle of each alternating voltage signal, current flows through the coil 442 in a direction to produce an alternating flux for attracting the movable contact of the switch 440 from the right stationary contact to the left stationary contact. This causes the voltage on the movable contact of the potentiometer 446 to be applied to the movable contact in the switch 440.

As previously disclosed, the potentiometer 446 may actually be included in extraneous apparatus such as a computer (not shown). The computer operates to position the movable contact of the potentiometer 446 in accordance with calculations performed in the computer. As a result of such calculations, the positioning of the movable contact in the potentiometer 446 represents a value of a first quantity such as the value of a quantity "*x*."

Because of the operation of the voltage regulator tube 458, a potential regulated at a particular value such as +100 volts is produced on the line 456. This voltage is applied to the series circuit including the resistance 452, the rheostat 450 and the resistance 454. Since the resistances 452 and 454 have values of approximately 10,000 ohms and the rheostat 450 has a full value of approximately 20,000 ohms, approximately 50 volts is produced across the rheostat 450 when its full value is effectively in the circuit. This voltage may be reduced to any value between 0 and +50 volts by varying the position of the movable contact in the rheostat 450 to reduce the effective resistive value provided by the rheostat.

The voltage produced across the series combination of the potentiometer 446 and the resistance 448 is dependent upon the voltage produced across the rheostat 450. Since the resistance 448 and the potentiometer 446 have equal values of approximately 10,000 ohms, approximately one half of the voltage developed across the rheostat 450 is produced across the potentiometer. For example, when 50 volts are produced across the rheostat 450, 25 volts are produced across the potentiometer 446. This causes considerable changes in voltage to be produced on the movable contact of the potentiometer 446 as its position is varied. Similarly, only 5 volts are produced across the potentiometer 446 when 10 volts are produced across the rheostat 450. This causes relatively small changes in voltage to be produced on the movable contact of the potentiometer 446 as its position is varied. In this way, the setting of the movable contact in the rheostat 450 controls the sensitivity in the voltage produced on the movable contact of the potentiometer 446.

The voltage on the movable contact of the potentiometer 446 passes through the left stationary contact of the switch 440 to the movable contact of the switch during the positive half of each cycle of alternating voltage. Since the movable contact of the switch 440 is spring-loaded, it returns to the right stationary contact in the switch during the negative half of each cycle of alternating voltage. This causes the voltage on the movable contact of the potentiometer 114 to be applied to the movable contact of the switch 440 during the negative half of each voltage cycle.

If there is any difference in the voltages on the movable contacts of the potentiometers 114 and 446, an alternating voltage is produced on the movable contact of the switch 440 as the movable contact vibrates back and forth between the left and right stationary contacts. This alternating voltage passes through the coupling capacitance to the pre-amplifiers 342. After pre-amplification, the signals pass through a circuit including the second and movable contacts of the switch 304 to the grid of the tube 344. The signals are amplified by the tube 344 and the amplifiers 396 as disclosed above and are applied to the winding 398 in the motor 74. Since signals are also applied to the winding 420 as disclosed above, the motor 74 rotates. The rotation of the motor 74 is damped because of the signals which are derived from the tachometer 76 and which are shifted in phase by the phase shifter 434. The signals from the phase shifter 434 are applied to the pre-amplifiers 342 with the signals from the switch 440 to control the operation of the motor as described above.

As the motor 74 rotates, it drives the potentiometer 114 through the gear train including the gears 80 (Figure 5), 82, 86 and 88. The motor drives the potentiometer 114 in a direction to make the voltage on the movable contact of the potentiometer 114 approach in value the voltage on the movable contact of the potentiometer 446. In this way, the motor operates in a servo loop. As a result of its operation in this manner, the motor 74 rotates only through an angle substantially directly proportional to the amplitude of the alternating signal produced on the movable contact of the switch 440.

The motor 74 also drives the pinion 148 to the right along the rack 150 in a manner disclosed above. The pinion 148 moves along the rack 150 through a distance linearly related to the angle through which the motor 74 rotates. This results from the operation of members including the bevel gear 120 (Figures 5, 6 and 7), the pinion 122, the planet gear 128, the sun gear 130, the planet gear 136 (Figures 6 and 7), the pinion 140 and the bevel gear 142.

The proportionate movement of the pinion 148 along the rack gear 150 may be seen from the schematic diagrams of the controlling members including the gears as seen in Figures 6 and 7. It will first be assumed that the bevel gear 120 is unable to rotate. It will also be assumed that the shafts 124 and 138 are in horizontal alignment and that horizontal arrows 500, 502 and 504 on the bevel gear 120, the sun gear 130 and the pinion 148 respectively indicate this horizontal alignment.

In order to change the shaft 124 from the horizontal positioning shown in Figure 6 to the inclined position shown in Figure 7 while the bevel gear 120 remains stationary, the pinion 122 and shaft 124 must rotate in a direction indicated by an arrow 508 in Figure 6. This causes the sun gear to rotate in the direction indicated by an arrow 510. Since the sun gear 130 rotates through the same number of teeth as the pinion 122, the arrow 502 changes in Figure 7 from a position parallel to the shaft 124 to a horizontal position as shown in Figure 7.

The sun gear 130 acts upon the planet gear 136 to rotate the gear in an opposite direction to the planet gear 128. This causes the planet gear 136, the shaft 138 and the pinion 140 to rotate in a direction indicated by an arrow 512. Rotation of the shaft 138 in this direction causes the shaft to become inclined to the vertical in an opposite direction to the inclination of the shaft 124. It might be expected that the arrow 504 on the pinion 148 would become aligned with the shaft 136 in its inclined position. However, the bevel gear 142 and the pinion 148 rotate in a direction indicated by an arrow 516 as the pinion 140 rotates such that the arrow 504 remains in the horizontal direction.

It will be seen from the above disclosure that the pinion 148 does not experience any different movement than the bevel gear 120 as the shafts 124 and 138 become cocked at different angles relative to each other. The shafts 124 and 138 become cocked at different angles relative to each other as the pinion 148 moves to the right along the rack 150. Since the pinion 148 follows only the movements of the bevel gear 120, the movement of the pinion 148 along the rack 150 is linearly related to the rotation of the motor 74 at any position along the rack. In this way, the position of the stylus 286 in the axial direction is proportional to the value of the quantity "*x*" as represented by the positioning of the movable contact in the potentiometer 446.

It has been disclosed above that the movable contact of the potentiometer 114 (Figures 5 and 20) is rotated by the motor 74 until the voltage on the movable contact becomes substantially equal to the voltage on the movable contact of the potentiometer 446. The potentiometer 114 is connected across the series branch formed by the resistances 470 and 472, each of which has a value such as 560 ohms. Since each of the resistances 460 and 464 has a value of approximately 18,500 ohms, the voltage developed across the resistances 470 and 472 is only about 2.5 volts. This is the maximum range of voltage which the movable contact of the potentiometer 114 can experience.

Although the potential on the movable contact of the potentiometer 114 can vary only within a fixed range of approximately 2.5 volts, the potential on the movable contact of the potentiometer 446 can vary between an adjustable range of 0 to 25 volts. As previously disclosed, the particular range of voltages which the movable contact of the potentiometer 446 can experience is dependent upon the positioning of the movable contact of the rheostat 450. In this way, the rheostat 450 controls the amount of adjustment which the movable contact of the potentiometer 114 must experience when the movable contact of the potentiometer 446 varies in position by a particular amount. Since the stylus 286 moves axially along the rack 150 through a distance related to the change in the positioning of the movable contact on the potentiometer 114, the rheostat 450 controls the scale factor of the graph along the X axis.

The potentiometer 474 and the resistances 476 and 478 are provided to make an accurate and sensitive adjustment of the "0" position on the X axis. Since each of the resistances 476 and 478 has a value of approximately 3,900 ohms and the potentiometer 474 has a value of approximately 20,000 ohms, almost 75 volts are produced across the potentiometer. By varying the positioning of the movable contact on the potentiometer 474, the voltage on the lower stationary contact of the potentiometer 114 in Figure 20 is correspondingly varied. This produces a corresponding adjustment in the potential level at which the movable contact of the potentiometer 114 starts to move from the lower stationary contact as the movable contact of the potentiometer 446 moves in a direction to receive an increased voltage.

Just as the switch 440 is vibrated by the coil 442 to produce an alternating voltage on its movable contact, the switch 480 is vibrated by the coil 482 to produce an alternating voltage on its movable contact. The alternating voltage is produced as the result of a difference in a pair of potentials from the bridge 484. One of these potentials is produced on the movable contact of the potentiometer 172 and the other potential is produced on the movable contact of a potentiometer (not shown) in the external computer. The potentiometer in the external computer corresponds to the potentiometer 446.

The alternating voltage produced on the movable contact of the switch 480 is amplified and then introduced to the grid of the tube 350 through the second stationary and movable contacts of the switch 306. After being further amplified by the tube 350 and the amplifiers 410, the signal is introduced to the coil 412 to produce an operation of the motor 160. The motor 160 then drives the potentiometer 172 in a direction to reduce the amplitude of the alternating voltage produced on the movable contact of the switch 480. The motor 160 also produces a rotary motion of the rack 150 so as to effectuate a pivotal movement of the stylus 286.

As has been disclosed above, the pivotal movement of the stylus 286 is independent of the axial movement of the stylus. In this way, the pivotal movement of the stylus 286 reflects the value of a second quantity which may be designated as "*y*." The scale factor of the pivotal movements of the stylus 286 can be varied by adjusting the movable contact of a rheostat in the bridge circuit 484 corresponding to the rheostat 450. Similarly, the "0" position of the stylus in the "*y*" direction can be varied by adjusting the movable contact of a potentiometer in the bridge circuit 484 corresponding to the potentiometer 474.

It has been disclosed that the graph plotter is in the "Calibrate" state of operation when the movable contacts of the switches 300, 302, 304 and 306 contact the second stationary contacts. In such a state of operation, a continuous circuit is established which includes the secondary winding 352, the movable and first stationary contacts of the switch 308, the second and movable contacts of the switch 302, the bridge formed by the diodes 330, 332, 334 and 336, the solenoid 198 and the first stationary and movable contacts of the switch 310. This causes the solenoid 198 to be energized such that the stylus 286 becomes withdrawn from the chart 62 in a manner similar to that disclosed above. In this way, no marks are placed on the chart 62 while the various potentiometers and other controls are being adjusted to obtain a proper "0" position and a proper scale factor.

When the movable contacts of the switches 300, 302, 304 and 306 are rotated in a clockwise direction to engage the third stationary contacts of the switches, a continuous circuit is again established to the solenoid 198. This circuit includes the secondary winding 352, the movable and first stationary contacts of the switch 308, the movable and third stationary contacts of the switch 300, the movable and right stationary contacts of the switch 322, the third stationary and movable contacts of the switch 302, the diode bridge, the solenoid 198 and the first stationary and movable contacts of the switch 310. When the solenoid 198 becomes energized, the movable contact of the microswitch 200 becomes actuated into engagement with the upper stationary contact in the switch.

The operation of the graph plotter is then initiated by depressing the button 370 (Figure 20). The button 370 may either be manually depressed or it may be depressed by the external computer (not shown) after certain computations have been made by the computer. By depressing the button 370, the movable contacts of the ganged switches 328 and 358 are pivoted into engagement with the lower stationary contacts of the switches. This causes a continuous circuit to be established which includes the secondary winding 352, the movable and first stationary contacts of the switch 308, the movable and third stationary contacts of the switch 300, the movable and right stationary contacts of the switch 322, the bottom stationary and movable contacts of the switch 328, the movable and bottom stationary contact of the switch 358, the relay windings 354 and 356, the upper stationary and movable contacts of the switch 200 and the first stationary and movable contacts of the switch 310.

The flow of current through the relay winding 354 causes the movable contacts of the ganged switches 320, 362, and 364 to be pivoted into engagement with the left stationary contacts of the switches. Similarly, the movable contact of the switch 324 is pivoted into engagement with the right stationary contact of the switch when the relay winding 356 becomes energized. Because of the actuation of the switch 320, the relay windings 354 and 356 are now energized through a self-locking circuit. This circuit includes the secondary winding 352, the movable and first stationary contacts of the switch 308, the movable and third stationary contacts of the switch 300, the movable and left stationary contacts of the switch 320, the relay windings 354 and 356, the upper stationary and movable contacts of the microswitch 200 and the first stationary and movable contacts of the switch 310.

With the movable contact of the switch 324 engaging the right stationary contact in Figure 20, a continuous circuit is established which includes the secondary winding 352, the movable and first stationary contacts of the switch 308, the right stationary and movable contacts of the switch 324, the right stationary and movable contacts of the switch 316, the first stationary and movable contacts of the switch 312, the windings 420, 422, 424 and 426 in parallel and the first stationary and movable contacts of the switch 310. The resultant flow of current through the windings 420, 422, 424 and 426 prepares the motors 74 and 160 and the tachometers 76 and 162 for operation.

The motor 74 becomes operative when an alternating voltage is produced on the movable contact of the switch 440 to indicate an error signal. This alternating voltage is amplified by the preamplifiers 342 and is subsequently amplified by the tube 344 and the amplifiers 396 after passing through the third stationary and movable contact of the switch 304. The alternating voltage is then applied to the winding 398 in the motor 74. Since voltage is also applied to the winding 420, the motor 74 operates and drives the potentiometer in a direction to equalize the voltages on the movable contacts of the potentiometers 114 and 446.

When the relay winding 354 becomes energized, it causes the movable contact of the switch 362 to be actuated into engagement with the left stationary contact of the switch. This causes a positive voltage to be applied to the plate of the thyratron tube 380 through a circuit including the power supply 372, the switch 362, the resistance 374 and the solenoid 376. The tube 380 is normally cut off because of the application of a negative voltage to its control grid during the time that either the motor 74 or the motor 160 is operating to drive the stylus 286 to its proper position. For example, when the stylus is not properly positioned in the "*x*" direction, a signal is produced by the amplifiers 396 and is introduced through the diode 388 and the resistive members 384 and 382 to the grid of the tube 380 to maintain the tube cut off. Similarly, a voltage is introduced from the amplifiers 410 through the diode 390 and the resistive members 384 and 382 to the grid of the tube 380 to maintain the tube cut off during the time that an error signal is being introduced to the winding 412.

When the motors 74 and 160 have operated to drive the stylus 286 to its proper position, the amplitude of the signals applied to the coils 398 and 412 drops to substantially zero. This causes a potential of approximately zero volts to be applied to the cathodes of the diodes 388 and 390. The plates of the diodes 388 and 390 follow the potentials on the cathode and cause a potential of approximately zero volts to be applied to the grid of the tube 380. This potential is sufficiently positive to produce a conduction of the tube 380 such that current flows through a circuit including the power supply 372, the left stationary and movable contacts of the switch 362, the resistance 374, the relay winding 376 and the tube.

Upon the flow of current through the relay winding 376, the movable contacts of the ganged switches 316 and 322 become actuated into engagement with their left stationary contacts. When the movable contact of the switch 316 leaves the right stationary contact of the switch, the continuous circuit to the windings 420, 422, 424 and 426 becomes interrupted. This prevents the motors 74 and 160 from thereafter becoming operative to change the position of the stylus 286. At the same time, the continuous circuit to the solenoid 198 becomes interrupted when the movable contact of the switch 322 leaves the right stationary contact of the switch.

Since current is unable to flow through the solenoid 198, the spring 210 (Figure 9) is now effective in moving the retracting member 208, the bottom of the rocker arm 204 and the actuator bar 212 to the right in Figures 9 and 16. This movement of the actuator bar 212 produces a movement of the cross bar 218 upwardly and to the right in the rack slot 220. The upwardly movement of the cross bar 220 permits the lever arm 242 to pivot in a clockwise direction in Figure 17 for a return of the lever arm to its normal position. The lever arm 242 in turn acts on the tang 245 and the tubing 246 to move the stylus 286 into contact with the chart 62. In this way, a point is marked by the stylus 286 on the chart 62.

Because of the interruption of current through the solenoid 198, the movable contact of the microswitch 200 pivots from the upper stationary contact into engagement with the lower stationary contact. When this occurs, a continuous circuit is established which includes the secondary winding 352, the movable and first stationary contacts of the switch 308, the movable and third stationary contacts of the switch 300, the movable and left stationary contacts of the switch 322, the lower stationary and movable contacts of the switch 358, the relay winding 368, the lower stationary and movable contacts of the switch 200 and the first stationary and movable contacts of the switch 310. The resultant flow of current through the relay winding 368 causes the movable contacts of the ganged switches 328 and 358 to be actuated into engagement with the upper stationary contacts of the switches.

The release of the movable contact of the microswitch 200 from the upper stationary contact of the microswitch also causes the flow of current through the relay windings 354 and 356 to become interrupted. This causes the movable contacts of the ganged switches 320, 362 and 364 to return into engagement with the right stationary contacts of the switches and the movable contact of the switch 324 to return into engagement with the left stationary contact of the switch. When the movable contact of the switch 362 leaves the left stationary contact, the current through the thyratron tube 380 becomes interrupted. Because of these actions, the graph plotter returns into its initial condition so that a new point can be plotted on the chart 62 when the button 370 becomes depressed.

Current flows through the primary winding of the transformer 326 at all times that the movable contacts of the switches 300, 302, 304 and 306 engage the third stationary contacts of the switches. The current flows through a circuit including the secondary winding 352, the movable and first stationary contacts of the switch 308, the primary winding of the transformer 326 and the first stationary and movable contacts of the switch 310. When the relay winding 354 becomes de-energized, a continuous circuit is established through the secondary winding of the transformer 326. This circuit includes the secondary winding of the transformer 326, the movable and right stationary contacts of the switch 364, the resistance 392, the diode 388 and the capacitance 386. The flow of current through this circuit causes the capacitance 386 to become charged.

Upon a subsequent depression of the button 370, current flows through the relay winding 354 in a manner similar to that disclosed above. This current causes the relay winding 354 to actuate the movable contacts of the switches 320, 362 and 364 into engagement with the left stationary contacts of the switches such that the continuous circuit through the secondary winding of the transformer 326 becomes interrupted. The capacitance 386 then discharges through the potentiometer 384. During the time that the capacitance is discharging, a negative bias is produced on the grid of the tube 380 to prevent the tube from becoming conductive. This causes a slight delay to occur between the plotting of successive points on the chart 62, even though the stylus 286 becomes instantaneously shifted to the proper position. This is desirable to make certain that the stylus 286 is in its proper position before it is released by the solenoid 198 to make a mark on the chart 62.

As has been disclosed above, the graph plotter constituting this invention is adapted to plot discrete and isolated points when the movable contacts of the switches 300, 302, 304 and 306 have been positioned to engage the third stationary contacts on the switches. The graph plotter is adapted to plot a continuous curve when the movable contacts of the switches 300, 302, 304 and 306 are pivoted in a clockwise direction to contact the fourth stationary contacts on the switches. This results from the fact that a continuous circuit is not established to the solenoid 198 through the switch 302. The graph represents the values indicated at different times by the movable contact of the potentiometer 446 and the movable contact of a corresponding potentiometer in the bridge circuit 484. This results in part from the operation of the motors 74 and 160, the windings of which receive voltages through circuits similar to those disclosed for the "Calibrate" position of the switches 300, 302, 304 and 306.

The system shown in Figure 20 is especially adapted to provide graphical indications representing digital quantities. As is well-known, digital indications can change only on a finite basis. Such digital indications are compared with the voltages on the movable contacts of the potentiometers 114 and 172 in the bridge circuits 449 and 484, respectively. Any differences in voltage are utilized to operate the motors 74 and 160 so that the movable contacts of the potentiometers 114 and 172 become positioned to minimize the difference voltages. Since the movable contacts of the potentiometers 114 and 172 vary in positioning by finite steps in accordance with the changes in the positioning of the movable contacts in the potentiometer 446 and a corresponding potentiometer in the bridge circuit 484, the supply voltage on the line 456 is not critical.

In analogue computations, the absolute value of a quantity must be obtained at any instant. This absolute value may vary infinitesimally with changes in time and not in finite steps as with digital values. For this reason, supply voltages become critical and it is highly desirable for these voltages to remain substantially constant. In Figure 21, a simplified diagram is shown of one type of circuit which has been used in the graph plotter for recording analogue quantities. The circuit includes a battery 550 having stable characteristics even with changes in load. One battery which may be used is designated as Type 555699 by Sensitive Research Instrument Corp. of Mt. Vernon, N. Y. The battery 550 may be a single cell adapted to supply a stable and constant potential of 1 volt.

The positive terminal of the battery 550 is connected to the top stationary contact of a switch 552 having three stationary contacts in Figure 21. Connections are made from the negative terminal of the battery 550 to the middle stationary contact of the switch 552 and to the upper stationary contact of a switch 554. The movable contact of the switch 554 is adapted to be vibrated by a coil 556 in a manner similar to that disclosed above for the switches 440 and 480 in Figure 20. A capacitance 558 and a resistance 560 extend from the movable contact of the switch 554 to ground. The voltage on the common terminal between the capacitance 558 and the resistance 560 is applied to amplifiers indicated in block form at 562 and operative on alternating signals.

The output from the amplifiers 562 is applied to the bottom stationary contact of a switch 564 adapted to be vibrated by a coil 566 in synchronization with the switch 554. A resistance 568 and a storage capacitance 570 extend in a series arrangement from the movable contact of the switch 564 to ground. The voltage on the common terminal between the resistance 568 and the capacitance 570 is applied to amplifiers indicated in block form at 572 and operative to amplify direct voltages.

The output from the amplifier 572 is introduced to the grid of a tube 574, the plate of which receives voltage through a resistance 576 from a power supply 578. The cathode of the tube 574 is connected through voltage divider stages 579 to the movable contact of the switch 552 and directly to first stationary contacts in potentiometers 580 and 582. The other stationary contacts of the potentiometer 580 and 582 are grounded.

The potentiometer 580 corresponds to the potentiometer 114 in Figure 20 and the potentiometer 582 corresponds to the zeroing potentiometer 474 in Figure 20. Resistances 584 and 586 extend in series between the movable contacts of the potentiometers 580 and 582. The voltage on the common terminal between the resistances 584 and 586 is applied to the upper stationary contact of a switch 588 functionally equivalent to the switch 440 in Figure 20. The bottom stationary contact of the switch 588 has a voltage applied to it to represent an analogue quantity. The alternating voltage produced on the movable contact of the switch is used to control the operation of a motor 590 corresponding to the motor 74 in Figure 20. The motor 590 drives the movable contact of the potentiometer 580 in a manner similar to that disclosed above.

When the movable contact of the switch 552 is rotated into engagement with the middle stationary contact of the switch, the voltage on the cathode of the tube 574 is applied directly to the upper stationary contact of the switch 554. As the movable contact of the switch 554 vibrates between the upper and lower stationary contacts of the switch, an alternating voltage is produced on the movable contact of the switch if there is any difference in voltage on the upper and lower stationary contacts, the lower contact being effectively at ground potential. In this way, the alternating voltage produced on the movable contact of the switch 554 represents the potential variation from ground on the cathode of the tube 574. This alternating voltage passes through the capacitance 558 for amplification by the amplifiers 562.

The signals from the amplifier 562 are introduced to the lower stationary contact of the switch 564. Since the upper stationary contact of the switch 564 is effectively at ground, an alternating voltage having an amplitude corresponding to that from the amplifiers 562 is produced on the movable contact of the switch 564. Only voltages having one polarity are produced on the movable contact of the switch 564. For example, an alternating voltage varying between ground and a negative amplitude is produced when the voltage on the cathode of the tube 574 has a value above ground. This results from the fact that the voltage on the cathode of the tube 574 is applied to the upper stationary contact of the switch 554 while the output from the amplifiers 562 is applied to the lower stationary contact of the switch 564.

The alternating voltage produced on the movable contact of the switch 564 causes the capacitance 570 to become charged to a value corresponding substantially to the peak amplitude of the alternating voltage. For example, the capacitance 570 receives a charge corresponding to a value of −0.1 direct volts when the amplitude of the signal on the movable contact of the switch 564 varies between ground and −0.1 volt. The voltage across the capacitance 570 is amplified and inverted by the amplifiers 572 and is introduced to the grid of the tube 574. Thus, a positive voltage is introduced to the grid of the tube 574 when the capacitance 570 becomes charged to a negative value. In the above example, this would cause the current flowing through the resistance 576 and the tube 574 to increase. This increase in current causes the voltage drop across the resistance 576 and the tube 574 to increase so as to produce a decrease in the voltage on the cathode of the tube. In this way, the voltage on the cathode of the tube 574 becomes regulated at substantially ground potential.

After the voltage on the cathode of the tube 574 has decreased to a valve of substantially "0" volts, the movable contact of the switch 552 is rotated into engagement with the top stationary contact of the switch. This causes the voltage on the battery 550 to oppose the voltage from the voltage dividers 579, the latter potential representing on a reduced scale the voltage on the cathode of the tube 574. The difference between the voltages from the voltage dividers 579 and the voltage on the battery 550 is applied to the upper stationary contact of the switch 554. Since the lower stationary contact of the switch 554 is essentially at ground potential, an alternating voltage having an amplitude representing the potential on the upper stationary contact of the switch is produced when the movable contact of the switch 554 vibrates.

The alternating voltage produced on the movable contact of the switch 554 is amplified by the amplifiers 562 and is applied to the lower stationary contact of the switch 564. This alternating voltage causes the capacitance 570 to become charged to a corresponding direct voltage in a manner similar to that described above. The direct voltage produced across the capacitance 570 is amplified by the amplifiers 572 and applied to the grid of the tube 574 to alter the conductivity of the tube. In this way, the voltage on the cathode of the tube 574 is adjusted so that the potential from the voltage divider 579 is substantially equal to the potential from the battery 550. Since the voltage from the battery 550 is quite stable, a relatively stable and constant voltage is produced on the cathode of the tube 574. This potential is stable even with changes in load current and other parameters.

The voltage on the cathode of the tube 574 is applied to one of the stationary contacts in the potentiometer 580 to maintain a substantially constant potential across the potentiometer. This causes the voltage on the movable contact of the potentiometer to be dependent upon the positioning of the movable contact and not upon variations in the voltage across the potentiometer. The voltage on the movable contact of the potentiometer 580 is applied through the resistance 584 to the upper stationary contact of the switch 588. This potential is compared with the potential on the lower stationary contact of the switch, the latter potential representing the analogue value to be plotted. The difference in the voltages on the upper and lower stationary contacts of the switch 588 is utilized by the motor 590 to drive the movable contact of the potentiometer 580 in a direction to minimize the difference voltage. Because of this, the movable contact of the potentiometer 580 represents at all times the analogue value to be plotted. This value is recorded by the stylus 286 on the chart 62.

The potentiometer 582 operates in a manner similar to the potentiometer 474 in Figure 20 to adjust the "0" position of the stylus 286. By adjusting the movable contact of the potentiometer 582, the potential on the common terminal between the resistances 584 and 586 is correspondingly varied. This results from the fact that the potential on the common terminal between the resistances 584 and 586 is approximately one half as great as the difference between the potentials on the movable contacts of the potentiometers 580 and 582.

It should be appreciated that the movable contact of the potentiometer 580 represents in positioning the value of only one quantity such as a quantity "*x*." In order to plot a curve, a second set of components similar to the potentiometers 580 and 582, the resistances 584 and 586, the switch 588 and the motor 590 would also have to be included. These components would control the positioning of the movable contact on a potentiometer corresponding to the potentiometer 580 so as to obtain a graphical record of a second quantity such as a quantity "*y*." These components are represented in Figure 21 by a block illustrated at 592 and designated as control members.

The apparatus disclosed above has certain important advantages. It utilizes a stylus movable in an axial direction to represent a first quantity and movable in an angular direction to represent a second quantity. By rotating the stylus to represent the second quantity, a graph plotter is obtained which is relatively simple in construction and which operates reliably and accurately through the full range of values to be plotted. Novel means are also included to produce a linear movement of the stylus in the axial direction in accordance with the value of the quantity to be plotted.

The graph plotter constituting this invention is also advantageous in that it can plot the relationship between various types of quantities. For example, the graph plotter operates simply and reliably to plot the relationship between a pair of digital quantities. It also operates to plot the relationship between a pair of quantities having isolated point-to-point values. The graph plotter can also be easily adapted in accordance with the system shown in Figure 21 to produce a record representing the relationship between a pair of analogue quantities. In this way, the plotter can be used with any type of computer to provide a record of computational values obtained by the computer.

We claim:

1. Recording apparatus, including, means for providing a first quantity variable in any relationship which is linear or non-linear and for providing signals representing the value of the quantity, means for providing a second quantity variable relative to the first quantity in any relationship which is linear or non-linear and for providing signals representing the value of the quantity, a chart holder disposed in a curved configuration to provide indications on a chart as to the value of the first quantity in the direction of curvature and to provide indications as to the value of the second quantity in a second direction transverse to the direction of curvature, a stylus, means for providing a displacement of the stylus along the chart in the direction of curvature in accordance with the signals representing the value of the first quantity, means for providing a displacement of the stylus along the chart in the second direction in accordance with the signals representing the value of the second quantity, and means including a pair of arms pivotally coupled to each other for maintaining substantially linear displacements of the stylus along the chart in the second direction over the full range of values of the second quantity and in proportion to the variations in the value of the second quantity.

2. Recording apparatus, including, means for supporting a chart in a curved configuration in a first direction and in a linear configuration in a second direction, means for providing first signals variable in any pattern having linear or non-linear characteristics to represent different values of a first parameter, means for providing second signals variable in any pattern having linear or non-linear characteristics to represent different values of a second parameter, a stylus, means for providing a pivotal movement of the stylus along the chart in the first direction in accordance with the characteristics of the first signals, means including an arm movable into different angular positions in accordance with the characteristics of the second signals, and means coupled to the arm for translating the angular positions of the arm into positionings of the stylus linearly related to the characteristics of the second signals.

3. Recording apparatus, including, a chart holder disposed for supporting a chart substantially along a segment of a cylinder, a stylus, a support member for the stylus and disposed for rotary movement, means for providing a movement of the stylus along the support member and the chart in an axial direction relative to the cylindrical segment in accordance with first signals representing a first quantity variable in any pattern having linear or non-linear characteristics, means for providing a movement of the stylus with the support member along the chart in an arcuate direction in accordance with second signals representing a second quantity variable in any pattern having linear or non-linear characteristics, and means for providing a recordation of information by the stylus on the chart at isolated positions representing particular values of the first and second quantities in accordance with control signals introduced to the recording apparatus.

4. Recording apparatus, including, a chart holder disposed for supporting a chart in substantially a segment of a cylinder, a support member disposed substantially along the axis of the cylindrical segment formed by the chart and fixedly disposed in the axial direction but rotatable in the direction of curvature, a stylus supported by the support member in pivotable relationship to the support member, means for providing first signals having characteristics variable in any pattern either linear or non-linear in accordance with the value of a first quantity, means for producing a linear movement of the stylus along the support member in substantially direct relation to the quantity represented by the first signals, means for providing second signals having characteristics variable in any pattern either linear or non-linear in accordance with the value of a second quantity, and means for producing a pivotal movement of the stylus with the support member in accordance with the quantity represented by the second signals.

5. Recording apparatus, including, a chart holder disposed for supporting a chart in a curve having the configuration of a circular arc in a first direction and having a substantially linear configuration in a second direction, a support member fixedly disposed in the second direction along the axis of the circular arc and rotatable in the first direction, means including a stylus pivotable at the radial center of the circular arc and movable along the support member in a linear path in the second direction, means for producing a pivotable movement of the stylus in the first direction in accordance with the characteristics of first signals representing a first quantity, and means for producing a linear movement of the stylus along the support member in the second direction in accordance with the characteristics of second signals representing a second quantity.

6. Recording apparatus, including, a chart holder disposed for supporting a chart in a curved configuration, a stylus, means for providing first signals having characteristics to represent the value of a first quantity variable in any pattern either linear or non-linear, means for providing second signals having characteristics to represent the value of a second quantity variable in any pattern either linear or non-linear; means for providing for a movement of the stylus along the chart in the curved direction in accordance with the characteristics of the first signals, means for providing for a movement of the stylus along the chart in a direction transverse to the first direction in accordance with the characteristics of the second signals, and means for controlling the positioning of the stylus with respect to the chart during the movement of the stylus along the chart to obtain markings on the chart only at desired positions and for controlling the times of producing such markings to obtain a movement of the stylus to the desired positions before the occurrence of such markings.

7. Recording apparatus, including, a chart holder disposed along substantially a segment of a cylinder for supporting a chart, a support member fixedly disposed in an axial direction along the axis of the cylindrical segment, a pinion movable along the support member; a stylus, means including the pinion for moving the stylus in the axial direction along the support member in accordance with first signals representing a first quantity and through a distance linearly related to the quantity, means for providing a relative movement between the chart and the stylus in an arcuate direction in accordance with second signals representing a second quantity, and means including electrical circuitry and associated switching means for controlling the type of record provided by the stylus during its movements relative to the chart to obtain a continuous graph in one position of the switching means and to obtain a plot of isolated points in another position of the switching means.

8. In recording apparatus having a chart disposable in one direction along substantially a linear axis, a support member disposed substantially in the direction of the linear axis to support the chart, first means including a stylus coupled to the support member for variable positioning on the support member in the linear direction, means including a shaft for producing a rotary movement of the shaft in accordance with the value of a quantity to be recorded, and means including a differential gear system and a pair of arms controlled by the differential gear system and coupled to the shaft for providing a linear translation of the rotative movement of the shaft to a displacement of the first means along the support member for a linear recording by the stylus of such rotary movement of the shaft.

9. In recording apparatus having a chart disposable in one direction along substantially a linear axis, a support member disposed in substantially the direction of the linear axis, driven means coupled to the support member for variable positioning on the support member in the axial direction, a driving shaft rotatively positioned in accordance with the value of a quantity to be recorded, means including first and second driven shafts for coupling the driving shaft to the driven means in variable angular displacement relative to each other and to the driven means and the support member for different rotative positions of the driving shaft, and means including a sun gear and a pair of planet gears for coupling the first and second driven shafts in their variable angular positionings and for translating the rotative displacements of the driving shaft into corresponding linear movements of the driven means along the support member.

10. A recording mechanism comprising cylindrically curved holding means adapted to receive a chart on which data is to be recorded and to maintain said chart in a concave position, stylus supporting means including a rack disposed coaxially with said chart, a stylus holder means for mounting the stylus holder on said supporting means, a pinion coupled to the rack, a pair of support arms, differential gearing coupling the support arms to provide for a variable positioning of the support arms relative to each other and to the pinion and rack, means including the pinion, the arms and the gearing differential for traversing said stylus holder axially of said stylus supporting means and through a distance linearly related to the value of a first quantity means for rotating said stylus holder about the axis of said stylus supporting means through a distance linearly related to the value of a second quantity, and a stylus mounted on said stylus supporting means to engage said chart markingly.

11. In a recording device, a framework, concave cylindrically curved chart supporting means disposed in said framework, stylus supporting means disposed coaxially with said chart supporting means and fixedly disposed in the axial direction and rotatable relative to the chart holder means, a stylus arm mounted on said stylus supporting means for movement lengthwise thereof, motor means rotatable through angles directly related to the value of a first quantity, differential gearing means extending between said motor means and said stylus holding means, said gearing being arranged to produce a displacement axially of said supporting means of said stylus arm in direct proportion to the rotation of said motor means, a stylus mounted on said stylus supporting means, means for rotating said stylus with said stylus supporting means through an angle directly related to the value of a second quantity, and means including switching means for obtaining in a first position of the switching means a continuous engagement between the stylus and the chart for the plotting of a continuous graph and for obtaining in a second position of the switching means an engagement between the switching means and the chart at isolated positions for the plotting of discrete points.

12. A recording mechanism, comprising a supporting frame, cylindrically curved holder means disposed in said frame and adapted to receive concavely a chart on which data is to be recorded, stylus supporting means disposed coaxially with said chart and fixedly disposed in the axial direction and rotatable relative to the chart holder means, a stylus holder mounted on said stylus supporting means to control the movements of a stylus, motor means for traversing said stylus holder axially of said stylus supporting means in accordance with the value of a first quantity, a pair of hinged connecting arms disposed between said motor means and said stylus supporting means, a shaft disposed axially through each of said hinged connecting arms, differential gearing means arranged to transmit proportional motion from said motor means to said stylus holder axially along said stylus supporting means and regardless of the angle between said hinged connecting arms, and means for rotating said stylus holder with said stylus supporting means in accordance with the value of a second quantity.

13. A recording mechanism comprising concave cylindrically curved holder means adapted to receive a chart on which data is to be recorded, stylus supporting means disposed coaxially with said chart in fixed axial position and in rotatable relationship to the chart holder means, means for mounting a stylus holder on said supporting means, means for providing signals representing a first quantity variable in any pattern including a linear or non-linear relationship, means for providing signals representing a second quantity variable in any pattern including a linear or non-linear relationship, means for traversing said stylus holder axially of said stylus supporting means upon the introduction of the signals representing the first quantity and through a distance directly related to the value of the first quantity, means for rotating said stylus holder with said stylus supporting means upon the introduction of the signals representing the second quantity and in direct angular relationship to the value of the second quantity, and a stylus mounted on said stylus supporting means to engage said chart for a plot of the relationship between the first and second quantities.

14. In a recording mechanism having a concave chart and arranged for the traversal of recording means to any desired point thereon, supporting means for a recording stylus disposed coaxially and rotatably relative to said concave chart, means for traversing said stylus axially of said supporting means in accordance with signals representing the value of a first quantity, means for rotating said supporting means and stylus in accordance with signals representing the value of a second quantity, means including electrical circuitry and switching means in the circuitry for obtaining in one position of the switching means a continuous plot on the chart of the relationship between the first and second quantities and for obtaining in a second position of the switching means a discrete plot on the chart of the relationship between the first and second quantities at isolated positions, means in the electrical circuitry for delaying each discrete plot of the relationship between the first and second quantities to insure a movement of the stylus to the proper position, and means including the electrical circuitry for obtaining a withdrawal of the stylus from the chart after each discrete plot.

15. Recording apparatus, including, a platen curved in the configuration of a cylindrical segment for holding a chart, a rack fixedly disposed along the axis of the cylindrical platen rotatable in the arcuate direction, the rack being provided with a plurality of discrete teeth each extending around the periphery of the rack in a direction substantially perpendicular to the platen axis and at spaced intervals, a pinion having teeth for engaging the teeth of the rack and movable axially along the rack, means for moving the pinion axially along the rack in accordance with the value of a first quantity, a stylus movable with the pinion in the axial direction for indicating the value of the first quantity on the chart, and means for rotating the rack and the stylus in accordance with the value of a second quantity to indicate the value of the second quantity on the chart.

16. Recording apparatus, including, means including first electrical circuitry and a first impedance network in the circuitry for providing a voltage having at any instant an amplitude representing a first quantity variable in any particular relationship including a linear as well as a non-linear relationship, means including second electrical circuitry and a second impedance network in the circuitry for providing a voltage having at any instant an amplitude representing a second quantity variable in any particular relationship including a linear as well as a non-linear relationship with respect to the first quantity, a chart holder disposed in a curved configuration to provide indications on a chart as to the value of the first quantity in the direction of curvature and to provide indications as to the value of the second quantity in a second direction transverse to the direction of curvature, means including a stylus disposed in marking relationship to the chart holder for movement along the chart in the first and second directions, means including the first electrical circuitry and a third impedance network in the circuitry for providing a displacement of the stylus along the chart in the direction of curvature in accordance with the signals representing the first quantity, means in the third impedance network for providing an adjustment of the amount of displacement of the stylus along the chart in the direction of curvature for different values of the first quantity and for providing an adjustment of the amount of such displacement to any value desired, means including electrical circuitry and a fourth impedance network in the circuitry for providing a displacement of the stylus along the chart in the transverse direction in accordance with the value of the second quantity, and means in the fourth impedance network for providing an adjustment of the amount of displacement of the stylus along the chart in the transverse direction for different values of the second quantity and for providing an adjustment of the amount of such displacement to any value desired.

17. Recording apparatus, including, means for providing signals representing a first quantity variable in any particular relationship including a linear as well as a non-linear relationship, means for providing signals representing a second quantity variable in any particular relationship including a linear as well as a non-linear relationship with respect to the first quantity, a chart holder disposed in a curved configuration to provide indications on a chart as to the value of the first quantity in the direction of curvature and to provide indications as to the value of the second quantity in a second direction transverse to the direction of curvature, means including a stylus disposed relative to the chart holder for the recording of indications on the chart and movable in the first and second directions along the chart, means including electrical circuitry and a first impedance network in the circuitry for providing a displacement of the stylus along the chart in the direction of curvature in accordance with the signals representing the first quantity, means including electrical circuitry and a second impedance network for providing a displacement of the stylus along the chart in the transverse direction in accordance with the signals representing the second quantity, means in the first impedance network for adjusting the position of the stylus along the chart in the direction of curvature for a zero value of the first quantity, and means in the second impedance network for adjusting the position of the stylus along the chart in the transverse direction for a zero value of the second quantity.

18. Recording apparatus, including, a platen having a curved configuration in a first direction and a linear configuration in a second direction transverse to the first direction to provide a support for a chart, a support member extending in the second direction and rotatable relative to the platen, means including a stylus mounted on the support member for movement along the support member in the second direction and coupled to the support member for rotary movement, means coupled to the support member for obtaining a rotary movement of the support member and the stylus through an angular distance related to the value of a first quantity, means including a pair of arms and a differential disposed between the arms for obtaining a linear movement of the stylus along the support member through a distance related to the value of a second quantity, means for adjusting the scale factor at which the different values of the first quantity are plotted on the chart in the first direction, and means for adjusting the scale factor at which the different values of the second quantity are plotted on the chart in the second direction.

19. Recording apparatus, including, a platen for supporting a chart in a curved configuration in a first direction and in a linear configuration in a second direction transverse to the first direction, a rack extending in the linear direction in rotatable relationship to the platen, the rack having a plurality of teeth disposed at spaced intervals along the rack and extending in a direction substantially perpendicular to the direction of the rack, a pinion having a plurality of teeth engaging the teeth in the rack for movement of the pinion along the rack, a shaft rotatable in accordance with the value of a first quantity, a first arm coupled to the shaft and a second arm coupled to the pinion, a differential coupling the first and second arms for obtaining variable positionings of the first and second arms relative to each other and to the shaft and pinion, means including the first and second arms and the differential for translating the rotary movement of the shaft into a corresponding linear movement of the pinion along the rack, means for obtaining a rotary movement of the rack in accordance with the value of a second quantity, and means including a stylus supported on the rack and coupled to the pinion for movement in the first direction in accordance with the rotary movements of the rack and for movement in the second direction in accordance with the linear movements of the pinion to plot the relationship between the first and second quantities.

20. Recording apparatus, including, first input means for providing first input signals having adjustable characteristics to represent a first quantity, second input means for providing second input signals having adjustable characteristics to represent a second quantity, a chart holder disposed to hold a chart in a curved configuration in a first direction and in a linear configuration in a second direction transverse to the first direction, a support member extending in the second direction and fixedly positioned in that direction but rotatable in the first direction, a stylus, means including a pinion for providing a movement of the stylus in the linear direction along the support member, means for rotating the support member and for providing a corresponding rotary movement of the stylus, a first motor, a first impedance member in driven relationship to the motor to provide control signals having adjustable characteristics representing the positioning of the stylus in the linear direction, electrical circuitry including the first input means and the first impedance member for producing signals representing any differences between the first input and control signals and for introducing the difference signals to the first motor to produce a linear movement of the stylus in a direction to reduce the difference signals, a second motor, a second impedance member in driven relationship to the motor to provide control signals having adjustable characteristics representing the positioning of the stylus in the rotary direction, and electrical circuitry including the second input means and the second impedance member for producing signals representing any differences between the second input and control signals and for introducing the difference signals to the second motor to produce a rotary movement of the stylus in a direction to reduce the difference signals.

21. Recording apparatus, including, means for providing signals having characteristics representing a first quantity variable in any particular relationship including a linear as well as a non-linear relationship, means for providing signals having characteristics representing a second quantity variable in any particular relationship including a linear as well as a non-linear relationship, a chart holder disposed to hold a chart in the configuration of a cylindrical segment, a stylus, first means for moving the stylus axially along the chart, second means for rotating the stylus, a plurality of switches, electrical circuitry including the switches being associated with the first and second means for producing in a first position of the switches a relative displacement between the stylus and the chart in the axial and rotary directions in accordance with the characteristics of the first and second signals and a withdrawal of the stylus from the chart to obtain a calibration of the graph plot in the first and second directions, and electrical circuitry including the switches being associated with the first and second means for producing in a second position of the switches a movement of the stylus into contact with the chart and a relative displacement between the stylus and the chart in the axial and rotary directions in accordance with the characteristics of the first and second signals to obtain a plot of the relationship between the first and second quantities.

22. Recording apparatus, including, means for providing first input signals having characteristics representing a first quantity, means for providing second input signals having characteristics representing a second quantity, a chart holder disposed to hold a chart in a curved configuration in a first direction and in a linear configuration in a second direction transverse to the first direction, a support member extending in the second direction in fixed positioning and rotatable in the first direction, the support member having a plurality of teeth disposed at spaced intervals and extending around the periphery of the support member in a direction substantially perpendicular to the second direction, a stylus carried on the support member, means including a pinion for producing a movement of the stylus along the support member in the linear direction, means for rotating the support member and for producing a corresponding movement of the stylus, a first motor for driving the pinion and the stylus in the linear direction, means disposed in driven relationship to the motor to provide control signals representing the positioning of the stylus in the linear direction, means including a first servo loop for operating the motor to drive the stylus in a direction for making the control signals equal to the input signals, a second motor for driving the support member and the stylus in the rotary direction, means disposed in driven relationship to the second motor to provide second control signals representing the positioning of the stylus in the rotary direction, and means including a second servo loop for operating the motor to drive the stylus in a direction for making the second control signals equal to the second input signals.

23. Recording apparatus, including, means for providing first input signals having characteristics representing a first quantity variable in any particular relationship including a linear as well as a non-linear relationship, means for providing second input signals having characteristics representing a second quantity variable in any particular relationship including a linear as well as a non-linear relationship, a chart holder disposed in a curved configuration to provide indications on a chart as to the value of the first quantity in the direction of curvature and to provide indications as to the value of the second quantity in a second direction transverse to the direction of curvature, a stylus movable in the first and second directions, a first motor for driving the stylus in the first direction, means disposed in driven relationship to the motor to provide first control signals representing the positioning of the stylus in the first direction, means including a first servo loop for operating the motor to drive the stylus in a direction for reducing any differences between the first input and control signals, a second motor for driving the stylus in the second direction, means disposed in driven relationship to the second motor to provide second control signals representing the positioning of the stylus in the second direction, means including a second servo loop for operating the motor to drive the stylus in a direction for reducing any differences between the second input and control signals, means for controlling the disposition of the stylus relative to the chart at any instant to obtain markings on the chart only during controlled periods of time and to obtain a calibration of the recording apparatus during other periods of time, and means for controlling the flow of fluid to the housing to obtain proper markings by the stylus on the chart during the controlled periods of time.

24. Recording apparatus, including, means for providing first input signals having characteristics representing a first quantity variable in any particular pattern including a linear as well as a non-linear relationship, means for providing second input signals having characteristics representing a second quantity variable in any particular pattern including a linear as well as a non-linear relationship, a chart holder disposed to hold a chart in substantially a cylindrical segment, a stylus movable axially along the cylindrical segment and rotatable in the direction of curvature of the cylindrical segment, a first motor for driving the stylus in the axial direction, means including a first impedance network and a first variable impedance in the network disposed in driven relationship to the motor to provide first control signals representing the positioning of thte stylus in the axial direction, means including a first servo loop for operating the motor to drive the stylus in a direction for making the first control signals equal to the first input signals, means including a second variable impedance in the first impedance network for providing an adjustment as to the amount of displacement of the stylus in the axial direction for each increment in the value of the first quantity, means including a second impedance network for providing an adjustment as to the zero displacement of the stylus in the first direction, a second motor for driving the stylus in the rotary direction, means including a third impedance network and a first variable impedance in the network disposed in driven relationship to the second motor to provide second control signals representing the positioning of the stylus in the rotary direction, means including a second servo loop for operating the second motor to drive the stylus in a direction for making the second control signals equal to the second input signals, means including a second variable impedance in the third impedance network for providing an adjustment as to the amount of displacement of the stylus in the rotary direction for each increment in the value of the second quantity, and means including a fourth impedance network for providing an adjustment as to the zero displacement of the stylus in the second direction.

25. Recording apparatus, including, first means for providing first signals having characteristics related to the value of a first quantity, second means for providing second signals having characteristics related to the value of a second quantity, a platen having a curved configuration in a first direction and a linear configuration in a second direction transverse to the first direction to provide a support for a chart, a support member extending in the second direction and rotatable relative to the platen, means including a stylus mounted on the support member for movement along the support member in the second direction and coupled to the support member for rotary movement, with the support member, means coupled to the support member for obtaining a rotary movement of the support member and the stylus through an angular distance related to the characteristics of the signals from the first means, and means including a first arm coupled to the support member and a second arm coupled to the second signal means and including a differential disposed between the arms for obtaining a linear movement of the stylus along the support member through a distance related to the characteristics of the signals from the second means.

26. Recording apparatus, including, means for providing a first input voltage having an amplitude representing a first analogue quantity variable in any particular pattern including a linear as well as a non-linear relationship, means for providing a second input voltage having an amplitude representing a second analogue quantity variable in any particular pattern including a linear as well as a non-linear relationship, a chart holder disposed to hold a chart in substantially a cylindrical segment, means including a stylus movable axially along the cylindrical segment and rotatable in the direction of curvature of the cylindrical segment, a first impedance network having at least a first adjustable impedance, a second impedance network having at least a second adjustable impedance, means for providing a substantially stable supply voltage, means including the voltage means connected in an electrical circuit to produce a voltage opposing the supply voltage for the production of a difference voltage and to provide a comparison between the difference voltage and ground for the production of a reference voltage having stable characteristics even with changes in load, means for applying the stable reference voltage to the first and second impedance networks to produce on the first and second adjustable impedances first and second control voltages corresponding only to the adjustments made in the impedances, a first motor for varying the first adjustable impedance, means for providing first error signals representing any differences between the first input and control voltages and for introducing the error signals to the first motor for a variation of the value of the adjustable impedance in a direction to minimize the error signals, a second motor for varying the second adjustable impedance, and means for providing second error signals representing any differences between the second input and control voltages and for introducing the error signals to the second motor for a variation of the value of the second adjustable impedance in a direction to minimize the error signals.

27. Recording apparatus, including, means for providing a first input voltage having an amplitude representing the value of a first analogue quantity, means for providing a second input voltage having an amplitude representing the value of a second analogue quantity, a platen disposed to support a chart in a configuration of a cylindrical segment, a support member extending along the axis of the cylindrical segment, the support member being rotatable but fixedly positioned in the axial direction, means including a pinion for providing a linear movement in the axial direction along the support member, a stylus movable with the pinion in the axial direction and with the support member in the rotary direction, a first impedance network, a second impedance network, means for introducing substantially constant and stable voltages to the first and second impedance networks, a first motor for driving the pinion and stylus in the axial direction, means including the first impedance network disposed in driven relationship to the motor to provide a first control voltage representing the positioning of the stylus in the axial direction, means including a first servo loop for operating the first motor to drive the stylus in a direction for minimizing any differences between the first input and control voltages, a second motor for driving the support member and stylus in a rotary direction, means including the second impedance network disposed in driven relationship to the motor to provide a second control voltage representing the positioning of the stylus in the rotary direction, and means including a second servo loop for operating the second motor to drive the stylus in a direction for minimizing any differences between the second input and control voltages.

28. Recording apparatus as set forth in claim 27, in which means are included in the first impedance network for adjusting the axial position of the pinion and the stylus for a zero value for the first input voltage and in which means are included in the second impedance network for adjusting the rotary position of the support member and the stylus for a zero value for the second input voltage.

29. Recording apparatus, including, means for providing first input signals having characteristics representing the value of a first quantity variable in any pattern including a linear as well as a non-linear relationship, means for providing second input signals having characteristics representing the value of a second quantity variable in any pattern including a linear as well as a non-linear relationship, a platen disposed to support a chart in a configuration conforming substantially to a segment of a cylinder, a support member disposed along the axis of the cylindrical segment and provided with a plurality of teeth spaced from one another at regular intervals and extending around the periphery of the support member in a direction substantially perpendicular to the axis of the cylindrical segment, the support member being rotatable but fixed in the axial direction, a shaft rotatable in accordance with the characteristics of the first signals, means including a pair of arms disposed in driven relationship to the shaft, a differential disposed between the pair of arms to provide for a variable positioning of the arms relative to each other and to the shaft, means including a pinion having teeth engaging the teeth in the support member for movement of the pinion axially along the support through a distance corresponding to the movement of the shaft, a stylus carried on the support member for movement with the pinion, means for rotating the support member in accordance with the characteristics of the second signals, and means including a guide rail and a spring disposed in driven relationship to the support member and coupled to the stylus for driving the stylus in accordance with the rotary movements of the support member.

30. Recording apparatus as set forth in claim 29, including, a first impedance network having a first adjustable impedance for providing first control signal representing the movement of the shaft, a first motor operative to vary the disposition of the shaft and to produce a corresponding variation in the value of the first adjustable impedance, means including first electrical circuitry forming a servo loop for producing first error signal representing any differences between the first input and control signals and for introducing these signals to the first motor to produce a movement of the shaft and the first adjustable impedance in a direction for reducing the error signals, a second impedance network having a second adjustable impedance for providing second control signals representing the rotary movement of the support member, a second motor operative to vary the rotary disposition of the support member and the stylus to produce a corresponding variation in the value of the second adjustable impedance, and means including second electrical circuitry forming a servo loop for producing second error signals representing any differences between the second input and control signals and for introducing these signals to the second motor to produce a movement of the support member and the second adjustable impedance in a direction for reducing the error signals.

31. Recording apparatus, including means for supporting a chart in an arcuate configuration in a first direction and in a linear configuration in a second direction substantially parallel to the axis of the arcuate configuration, a support member disposed substantially along the axis of the cylindrical segment formed by the chart and fixedly disposed in the axial direction but rotatable in the direction of curvature, means including a stylus movable in the second direction along the support member and pivotable with the support member in the first direction, means for driving the stylus in response to variations in the magnitude of a first variable for indicating the instantaneous value of the variable by the position of the stylus in the first direction, and means for driving the stylus in response to variations in the magnitude of a second variable for indicating the instantaneous value of the variable by the position of the stylus in the second direction, and means included in the driving means and coupled to the stylus for independently obtaining the movements of the stylus in each of the first and second directions without affecting the positioning of the stylus in the other direction.

32. Recording apparatus, including means for supporting a chart in an arcuate configuration in a first direction and in a linear configuration in a second direction substantially parallel to the axis of the arcuate configuration, a support member disposed substantially along the axis of the cylindrical segment formed by the chart and fixedly disposed in the axial direction but rotatable in the direction of curvature, a stylus, means including an arm for holding the stylus on the support member to follow the movements of the support member in the first direction and to move independently along the support member in the second direction, driving means responsive to a first variable for moving the arm and the stylus in the first direction to produce instantaneous indications on the chart as to the value of the first variable, driving means responsive to a second variable for moving the arm and the stylus in the second direction to provide instantaneous indications on the chart as to the value of the second variable, and means associated with the holding means and the stylus for providing movements of the holding means and the stylus in each direction independently of any movements of the holding means and the stylus in the other direction for any positioning of the stylus to provide accurate representation as to the values of the first and second quantities at any instant.

References Cited in the file of this patent

UNITED STATES PATENTS

| | | |
|---|---|---|
| 135,293 | Smith | Jan. 28, 1873 |
| 738,221 | Maxted | Sept. 8, 1903 |
| 1,285,049 | Cooney | Nov. 19, 1918 |
| 1,692,611 | Baskerville | Nov. 20, 1928 |
| 1,798,983 | Parsons | Mar. 31, 1931 |
| 2,348,923 | Perricone | May 16, 1944 |
| 2,392,487 | Lee | Jan. 8, 1946 |
| 2,424,118 | Rast | July 15, 1947 |
| 2,464,708 | Moseley | Mar. 15, 1949 |
| 2,566,546 | Barnes et al. | Sept. 4, 1951 |
| 2,569,328 | Omberg | Sept. 25, 1951 |
| 2,606,093 | Reason | Aug. 5, 1952 |
| 2,626,151 | Jenks | Jan. 20, 1953 |
| 2,667,402 | Traugott | Jan. 26, 1954 |